United States Patent
Lewis et al.

(10) Patent No.: US 11,272,599 B1
(45) Date of Patent: Mar. 8, 2022

(54) CALIBRATION PROCEDURE FOR A LIGHT-EMITTING DIODE LIGHT SOURCE

(71) Applicant: Lutron Technology Company LLC, Coopersburg, PA (US)

(72) Inventors: Jason E. Lewis, Driftwood, TX (US); Jivan J. Luu, Austin, TX (US); Alcides J. Dias, Bee Cave, TX (US); Jacob Guerra, Austin, TX (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 16/446,869

(22) Filed: Jun. 20, 2019

Related U.S. Application Data

(60) Provisional application No. 62/688,746, filed on Jun. 22, 2018, provisional application No. 62/689,642, filed on Jun. 25, 2018.

(51) Int. Cl.
*H05B 45/50* (2020.01)
*H05B 45/10* (2020.01)
(Continued)

(52) U.S. Cl.
CPC ............. *H05B 45/50* (2020.01); *H05B 45/10* (2020.01)

(58) Field of Classification Search
CPC ........ H05B 45/50; H05B 45/10; H05B 45/60; H05B 45/00; H05B 47/00
(Continued)

(56) References Cited

U.S. PATENT DOCUMENTS

| 4,029,976 A | 6/1977 | Fish et al. |
|---|---|---|
| 4,402,090 A | 8/1983 | Gfeller et al. |

(Continued)

FOREIGN PATENT DOCUMENTS

| CN | 1291282 | 4/2001 |
|---|---|---|
| CN | 1396616 | 2/2003 |

(Continued)

OTHER PUBLICATIONS

Hall et al., "Jet Engine Control Using Ethernet with a BRAIN (Postprint)," AIAA/ASME/SAE/ASEE Joint Propulsion Conference and Exhibition, Jul. 2008, pp. 1-18.

(Continued)

*Primary Examiner* — Wei (Victor) Y Chan
(74) *Attorney, Agent, or Firm* — Condo Roccia Koptiw LLP

(57) ABSTRACT

A lighting device, such a controllable light-emitting diode (LED) light source, may execute a self calibration procedure to compensate for changes to an optical system of the lighting device that may have occurred after an initial factory calibration procedure. The lighting device may include an emitter, a detector that generates a detector signal in response to detected light, a memory that stores a curve defining an optical compensation value with respect to a measured forward voltage of the detector, and a control circuit configured to receive a measured value of a luminous flux of the light emitted by the emitter that may be determined in response to the detector signal and based the optical compensation value. The control circuit may adjust the curve defining the optical compensation value in response to a difference between the measured value and an expected value of the luminous flux.

23 Claims, 8 Drawing Sheets

(51) Int. Cl.
    *H05B 47/19*    (2020.01)
    *H05B 45/20*    (2020.01)
    *H05B 47/195*   (2020.01)
    *H05B 47/105*   (2020.01)
    *H05B 47/115*   (2020.01)

(58) Field of Classification Search
    USPC .................. 315/297, 307, 151, 152, 294
    See application file for complete search history.

(56) References Cited

U.S. PATENT DOCUMENTS

| | | |
|---|---|---|
| 4,713,841 A | 12/1987 | Porter et al. |
| 4,744,672 A | 5/1988 | Turskey et al. |
| 4,745,402 A | 5/1988 | Auerbach |
| 4,809,359 A | 2/1989 | Dockery |
| 5,018,057 A | 5/1991 | Biggs et al. |
| 5,103,466 A | 4/1992 | Bazes |
| 5,181,015 A | 1/1993 | Marshall et al. |
| 5,193,201 A | 3/1993 | Tymes |
| 5,218,356 A | 6/1993 | Knapp |
| 5,299,046 A | 3/1994 | Spaeth et al. |
| 5,317,441 A | 5/1994 | Sidman |
| 5,541,759 A | 7/1996 | Neff et al. |
| 5,619,262 A | 4/1997 | Uno |
| 5,657,145 A | 8/1997 | Smith |
| 5,797,085 A | 8/1998 | Beuk et al. |
| 5,905,445 A | 5/1999 | Gurney et al. |
| 6,016,038 A | 1/2000 | Mueller et al. |
| 6,067,595 A | 5/2000 | Lindenstruth |
| 6,069,929 A | 5/2000 | Yabe et al. |
| 6,084,231 A | 7/2000 | Popat |
| 6,094,014 A | 7/2000 | Bucks et al. |
| 6,094,340 A | 7/2000 | Min |
| 6,108,114 A | 8/2000 | Gilliland et al. |
| 6,127,783 A | 10/2000 | Pashley et al. |
| 6,147,458 A | 11/2000 | Bucks et al. |
| 6,150,774 A | 11/2000 | Mueller et al. |
| 6,234,645 B1 | 5/2001 | Borner et al. |
| 6,234,648 B1 | 5/2001 | Borner et al. |
| 6,250,774 B1 | 6/2001 | Begemann et al. |
| 6,333,605 B1 | 12/2001 | Grouev et al. |
| 6,344,641 B1 | 2/2002 | Blalock et al. |
| 6,356,774 B1 | 3/2002 | Bernstein et al. |
| 6,359,712 B1 | 3/2002 | Kamitani |
| 6,384,545 B1 | 5/2002 | Lau |
| 6,396,815 B1 | 5/2002 | Greaves et al. |
| 6,414,661 B1 | 7/2002 | Shen et al. |
| 6,441,558 B1 | 8/2002 | Muthu et al. |
| 6,448,550 B1 | 9/2002 | Nishimura |
| 6,495,964 B1 | 12/2002 | Muthu et al. |
| 6,498,440 B2 | 12/2002 | Stam et al. |
| 6,513,949 B1 | 2/2003 | Marshall et al. |
| 6,577,512 B2 | 6/2003 | Tripathi et al. |
| 6,617,795 B2 | 9/2003 | Bruning |
| 6,636,003 B2 | 10/2003 | Rahm et al. |
| 6,639,574 B2 | 10/2003 | Scheibe |
| 6,664,744 B2 | 12/2003 | Dietz |
| 6,692,136 B2 | 2/2004 | Marshall et al. |
| 6,741,351 B2 | 5/2004 | Marshall et al. |
| 6,753,661 B2 | 6/2004 | Muthu et al. |
| 6,788,011 B2 | 9/2004 | Mueller et al. |
| 6,806,659 B1 | 10/2004 | Mueller et al. |
| 6,831,569 B2 | 12/2004 | Wang et al. |
| 6,831,626 B2 | 12/2004 | Nakamura et al. |
| 6,853,150 B2 | 2/2005 | Clauberg et al. |
| 6,879,263 B2 | 4/2005 | Pederson et al. |
| 6,965,205 B2 | 11/2005 | Piepgras et al. |
| 6,969,954 B2 | 11/2005 | Lys |
| 6,975,079 B2 | 12/2005 | Lys et al. |
| 7,006,768 B1 | 2/2006 | Franklin |
| 7,014,336 B1 | 3/2006 | Ducharme et al. |
| 7,038,399 B2 | 5/2006 | Lys et al. |
| 7,046,160 B2 | 5/2006 | Pederson et al. |
| 7,072,587 B2 | 7/2006 | Dietz et al. |
| 7,088,031 B2 | 8/2006 | Brantner et al. |
| 7,119,500 B2 | 10/2006 | Young |
| 7,135,824 B2 | 11/2006 | Lys et al. |
| 7,161,311 B2 | 1/2007 | Mueller et al. |
| 7,166,966 B2 | 1/2007 | Naugler, Jr. et al. |
| 7,194,209 B1 | 3/2007 | Robbins et al. |
| 7,233,115 B2 | 6/2007 | Lys |
| 7,233,831 B2 | 6/2007 | Blackwell |
| 7,252,408 B2 | 8/2007 | Mazzochette et al. |
| 7,255,458 B2 | 8/2007 | Ashdown |
| 7,256,554 B2 | 8/2007 | Lys |
| 7,262,559 B2 | 8/2007 | Tripathi et al. |
| 7,294,816 B2 | 11/2007 | Ng et al. |
| 7,315,139 B1 | 1/2008 | Selvan et al. |
| 7,319,298 B2 | 1/2008 | Jungwirth et al. |
| 7,329,998 B2 | 2/2008 | Jungwirth |
| 7,330,002 B2 | 2/2008 | Joung |
| 7,330,662 B2 | 2/2008 | Zimmerman |
| 7,352,972 B2 | 4/2008 | Franklin |
| 7,358,706 B2 | 4/2008 | Lys |
| 7,359,640 B2 | 4/2008 | Onde et al. |
| 7,362,320 B2 | 4/2008 | Payne et al. |
| 7,372,859 B2 | 5/2008 | Hall et al. |
| 7,391,406 B2 | 6/2008 | Yamamoto et al. |
| 7,400,310 B2 | 7/2008 | LeMay |
| 7,445,340 B2 | 11/2008 | Conner et al. |
| 7,511,695 B2 | 3/2009 | Furukawa et al. |
| 7,525,611 B2 | 4/2009 | Zagar et al. |
| 7,553,033 B2 | 6/2009 | Seki |
| 7,554,514 B2 | 6/2009 | Nozawa |
| 7,573,210 B2 | 8/2009 | Ashdown et al. |
| 7,583,901 B2 | 9/2009 | Nakagawa et al. |
| 7,606,451 B2 | 10/2009 | Morita |
| 7,607,798 B2 | 10/2009 | Panotopoulos |
| 7,619,193 B2 | 11/2009 | Deurenberg |
| 7,649,527 B2 | 1/2010 | Cho et al. |
| 7,656,371 B2 | 2/2010 | Shimizu et al. |
| 7,659,672 B2 | 2/2010 | Yang |
| 7,683,864 B2 | 3/2010 | Lee et al. |
| 7,701,151 B2 | 4/2010 | Petrucci et al. |
| 7,705,541 B2 | 4/2010 | Watanabe et al. |
| 7,733,488 B1 | 6/2010 | Johnson |
| 7,737,936 B2 | 6/2010 | Daly |
| 7,801,600 B1 | 9/2010 | Carbunaru et al. |
| 7,828,479 B1 | 11/2010 | Aslan et al. |
| 8,013,538 B2 | 9/2011 | Zampini et al. |
| 8,018,135 B2 | 9/2011 | Van De Ven et al. |
| 8,035,603 B2 | 10/2011 | Furukawa et al. |
| 8,040,299 B2 | 10/2011 | Kretz et al. |
| 8,044,899 B2 | 10/2011 | Ng et al. |
| 8,044,918 B2 | 10/2011 | Choi |
| 8,057,072 B2 | 11/2011 | Takenaka et al. |
| 8,075,182 B2 | 12/2011 | Dai et al. |
| 8,076,869 B2 | 12/2011 | Shatford et al. |
| 8,159,150 B2 | 4/2012 | Ashdown et al. |
| 8,174,197 B2 | 5/2012 | Ghanem et al. |
| 8,174,205 B2 | 5/2012 | Myers et al. |
| 8,264,171 B1 | 9/2012 | Dorner |
| 8,283,876 B2 | 10/2012 | Ji |
| 8,287,150 B2 | 10/2012 | Schaefer et al. |
| 8,299,722 B2 | 10/2012 | Melanson |
| 8,358,075 B2 | 1/2013 | Sejkora et al. |
| 8,362,707 B2 | 1/2013 | Draper et al. |
| 8,471,496 B2 | 6/2013 | Knapp |
| 8,521,035 B2 | 8/2013 | Knapp et al. |
| 8,546,842 B2 | 10/2013 | Higuma et al. |
| 8,556,438 B2 | 10/2013 | McKenzie et al. |
| 8,569,974 B2 | 10/2013 | Chobot |
| 8,595,748 B1 | 11/2013 | Haggerty et al. |
| 8,624,527 B1 | 1/2014 | Meir et al. |
| 8,633,655 B2 | 1/2014 | Kao et al. |
| 8,643,043 B2 | 2/2014 | Shimizu et al. |
| 8,646,940 B2 | 2/2014 | Jang |
| 8,653,758 B2 | 2/2014 | Radermacher et al. |
| 8,657,463 B2 | 2/2014 | Lichten et al. |
| 8,659,237 B2 | 2/2014 | Archenhold |
| 8,680,787 B2 | 3/2014 | Veskovic |
| 8,704,666 B2 | 4/2014 | Baker, Jr. |
| 8,721,115 B2 | 5/2014 | Ing et al. |

(56) References Cited

U.S. PATENT DOCUMENTS

| | | |
|---|---|---|
| 8,749,172 B2 | 6/2014 | Knapp |
| 8,773,032 B2 | 7/2014 | May et al. |
| 8,791,647 B2 | 7/2014 | Kesterson et al. |
| 8,807,792 B2 | 8/2014 | Cho et al. |
| 8,816,600 B2 | 8/2014 | Elder |
| 8,820,962 B2 | 9/2014 | Kang |
| 8,911,160 B2 | 12/2014 | Seo et al. |
| 9,004,724 B2 | 4/2015 | Gao |
| 9,074,751 B2 | 7/2015 | Son et al. |
| 9,084,310 B2 | 7/2015 | Bedell et al. |
| 9,155,155 B1 | 10/2015 | Ho et al. |
| 9,210,750 B2 | 12/2015 | Van Der Veen et al. |
| 9,237,620 B1 | 1/2016 | Knapp et al. |
| 9,247,605 B1 | 1/2016 | Ho et al. |
| 9,332,598 B1 | 5/2016 | Ho et al. |
| 9,337,925 B2 | 5/2016 | Pickard et al. |
| 9,345,097 B1 | 5/2016 | Ho et al. |
| 9,360,174 B2 | 6/2016 | Dong et al. |
| 9,392,660 B2 | 7/2016 | Dias et al. |
| 9,392,663 B2 | 7/2016 | Knapp et al. |
| 9,485,813 B1 | 11/2016 | Lewis et al. |
| 9,497,808 B2 | 11/2016 | Murata et al. |
| 9,500,324 B2 | 11/2016 | Dong |
| 9,510,416 B2 | 11/2016 | Dias et al. |
| 9,538,619 B2 | 1/2017 | Swatsky et al. |
| 9,557,214 B2 | 1/2017 | Ho et al. |
| 9,578,724 B1 | 2/2017 | Knapp et al. |
| 9,651,632 B1 | 5/2017 | Knapp et al. |
| 9,736,895 B1 | 8/2017 | Dong et al. |
| 9,736,903 B2 | 8/2017 | Lewis et al. |
| 9,769,899 B2 | 9/2017 | Ho et al. |
| 9,888,543 B2 | 2/2018 | Chitta et al. |
| 9,954,435 B2 | 4/2018 | Knauss et al. |
| 10,595,372 B2 | 3/2020 | Ho et al. |
| 2001/0020123 A1 | 9/2001 | Diab et al. |
| 2001/0030668 A1 | 10/2001 | Erten et al. |
| 2002/0014643 A1 | 2/2002 | Kubo et al. |
| 2002/0033981 A1 | 3/2002 | Keller et al. |
| 2002/0047624 A1 | 4/2002 | Stam et al. |
| 2002/0049933 A1 | 4/2002 | Nyu |
| 2002/0134908 A1 | 9/2002 | Johnson |
| 2002/0138850 A1 | 9/2002 | Basil et al. |
| 2002/0171608 A1 | 11/2002 | Kanai et al. |
| 2003/0103413 A1 | 6/2003 | Jacobi, Jr. et al. |
| 2003/0122749 A1 | 7/2003 | Booth, Jr. et al. |
| 2003/0133491 A1 | 7/2003 | Shih |
| 2003/0179721 A1 | 9/2003 | Shurmantine et al. |
| 2004/0044709 A1 | 3/2004 | Cabrera et al. |
| 2004/0052076 A1 | 3/2004 | Mueller et al. |
| 2004/0052299 A1 | 3/2004 | Jay et al. |
| 2004/0101312 A1 | 5/2004 | Cabrera |
| 2004/0136682 A1 | 7/2004 | Watanabe |
| 2004/0201793 A1 | 10/2004 | Anandan et al. |
| 2004/0220922 A1 | 11/2004 | Lovison et al. |
| 2004/0257311 A1 | 12/2004 | Kanai et al. |
| 2005/0004727 A1 | 1/2005 | Remboski et al. |
| 2005/0030203 A1 | 2/2005 | Sharp et al. |
| 2005/0030267 A1 | 2/2005 | Tanghe et al. |
| 2005/0053378 A1 | 3/2005 | Stanchfield et al. |
| 2005/0077838 A1 | 4/2005 | Blumel |
| 2005/0110777 A1 | 5/2005 | Geaghan et al. |
| 2005/0169643 A1 | 8/2005 | Franklin |
| 2005/0200292 A1 | 9/2005 | Naugler, Jr. et al. |
| 2005/0207157 A1 | 9/2005 | Tani |
| 2005/0242742 A1 | 11/2005 | Cheang et al. |
| 2005/0265731 A1 | 12/2005 | Keum et al. |
| 2006/0061288 A1 | 3/2006 | Zwanenburg et al. |
| 2006/0145887 A1 | 7/2006 | McMahon |
| 2006/0164291 A1 | 7/2006 | Gunnarsson |
| 2006/0198463 A1 | 9/2006 | Godin |
| 2006/0220990 A1 | 10/2006 | Coushaine et al. |
| 2006/0227085 A1 | 10/2006 | Boldt, Jr. et al. |
| 2007/0040512 A1 | 2/2007 | Jungwirth et al. |
| 2007/0109239 A1 | 5/2007 | den Boer et al. |
| 2007/0132592 A1 | 6/2007 | Stewart et al. |
| 2007/0139957 A1 | 6/2007 | Haim et al. |
| 2007/0248180 A1 | 10/2007 | Bowman et al. |
| 2007/0254694 A1 | 11/2007 | Nakagwa et al. |
| 2007/0279346 A1 | 12/2007 | den Boer et al. |
| 2007/0284994 A1 | 12/2007 | Morimoto et al. |
| 2008/0061717 A1 | 3/2008 | Bogner et al. |
| 2008/0078733 A1 | 4/2008 | Nearman et al. |
| 2008/0107029 A1 | 5/2008 | Hall et al. |
| 2008/0120559 A1 | 5/2008 | Yee |
| 2008/0136334 A1 | 6/2008 | Robinson et al. |
| 2008/0136770 A1 | 6/2008 | Peker et al. |
| 2008/0136771 A1 | 6/2008 | Chen et al. |
| 2008/0150864 A1 | 6/2008 | Bergquist |
| 2008/0186898 A1 | 8/2008 | Petite |
| 2008/0222367 A1 | 9/2008 | Co |
| 2008/0235418 A1 | 9/2008 | Werthen et al. |
| 2008/0253766 A1 | 10/2008 | Yu et al. |
| 2008/0265799 A1 | 10/2008 | Sibert |
| 2008/0297070 A1 | 12/2008 | Kuenzler et al. |
| 2008/0304833 A1 | 12/2008 | Zheng |
| 2008/0309255 A1 | 12/2008 | Myers et al. |
| 2008/0317475 A1 | 12/2008 | Pederson et al. |
| 2009/0016390 A1 | 1/2009 | Sumiyama et al. |
| 2009/0026978 A1 | 1/2009 | Robinson |
| 2009/0040154 A1 | 2/2009 | Scheibe |
| 2009/0049295 A1 | 2/2009 | Erickson et al. |
| 2009/0051496 A1 | 2/2009 | Pahlavan et al. |
| 2009/0121238 A1 | 5/2009 | Peck |
| 2009/0171571 A1 | 7/2009 | Son et al. |
| 2009/0196282 A1 | 8/2009 | Fellman et al. |
| 2009/0245101 A1 | 10/2009 | Kwon et al. |
| 2009/0278789 A1 | 11/2009 | Declercq et al. |
| 2009/0284511 A1 | 11/2009 | Takasugi et al. |
| 2009/0303972 A1 | 12/2009 | Flammer, III et al. |
| 2010/0005533 A1 | 1/2010 | Shamir |
| 2010/0020264 A1 | 1/2010 | Ohkawa |
| 2010/0054748 A1 | 3/2010 | Sato |
| 2010/0061734 A1 | 3/2010 | Knapp |
| 2010/0096447 A1 | 4/2010 | Kwon et al. |
| 2010/0134021 A1 | 6/2010 | Ayres |
| 2010/0134024 A1 | 6/2010 | Brandes |
| 2010/0141159 A1 | 6/2010 | Shiu et al. |
| 2010/0182294 A1 | 7/2010 | Roshan et al. |
| 2010/0188443 A1 | 7/2010 | Lewis et al. |
| 2010/0188972 A1 | 7/2010 | Knapp |
| 2010/0194299 A1 | 8/2010 | Ye et al. |
| 2010/0213856 A1 | 8/2010 | Mizusako |
| 2010/0272437 A1 | 10/2010 | Yoon et al. |
| 2010/0301777 A1 | 12/2010 | Kraemer |
| 2010/0327764 A1 | 12/2010 | Knapp |
| 2011/0031894 A1 | 2/2011 | Van De Ven |
| 2011/0044343 A1 | 2/2011 | Sethuram et al. |
| 2011/0052214 A1 | 3/2011 | Shimada et al. |
| 2011/0062874 A1 | 3/2011 | Knapp |
| 2011/0063214 A1 | 3/2011 | Knapp |
| 2011/0063268 A1 | 3/2011 | Knapp |
| 2011/0068699 A1 | 3/2011 | Knapp |
| 2011/0069094 A1 | 3/2011 | Knapp |
| 2011/0069960 A1 | 3/2011 | Knapp et al. |
| 2011/0084701 A1 | 4/2011 | Bancken et al. |
| 2011/0133654 A1 | 6/2011 | McKenzie et al. |
| 2011/0148315 A1 | 6/2011 | Van Der Veen et al. |
| 2011/0150028 A1 | 6/2011 | Nguyen et al. |
| 2011/0187281 A1 | 8/2011 | Lu |
| 2011/0241572 A1 | 10/2011 | Zhang et al. |
| 2011/0248640 A1 | 10/2011 | Welten |
| 2011/0253915 A1 | 10/2011 | Knapp |
| 2011/0299854 A1 | 12/2011 | Jonsson et al. |
| 2011/0309754 A1* | 12/2011 | Ashdown ............... H05B 45/39 |
| | | 315/151 |
| 2012/0001570 A1 | 1/2012 | Deurenberg et al. |
| 2012/0056545 A1 | 3/2012 | Radermacher et al. |
| 2012/0153839 A1 | 6/2012 | Farley et al. |
| 2012/0229032 A1 | 9/2012 | Van De Ven et al. |
| 2012/0286694 A1 | 11/2012 | Elder |
| 2012/0299481 A1 | 11/2012 | Stevens |
| 2012/0306370 A1 | 12/2012 | Van De Ven et al. |
| 2013/0009551 A1 | 1/2013 | Knapp |
| 2013/0016978 A1 | 1/2013 | Son et al. |

(56) References Cited

U.S. PATENT DOCUMENTS

| | | | |
|---|---|---|---|
| 2013/0088522 A1 | 4/2013 | Gettemy et al. | |
| 2013/0201690 A1 | 8/2013 | Vissenberg et al. | |
| 2013/0257314 A1 | 10/2013 | Alvord et al. | |
| 2013/0293147 A1 | 11/2013 | Rogers et al. | |
| 2014/0028377 A1 | 1/2014 | Rosik et al. | |
| 2014/0225529 A1 | 8/2014 | Beczkowski | |
| 2014/0333202 A1 | 11/2014 | Hechtfischer | |
| 2015/0022110 A1 | 1/2015 | Sisto | |
| 2015/0055960 A1 | 2/2015 | Zheng et al. | |
| 2015/0155459 A1 | 6/2015 | Ishihara et al. | |
| 2015/0312990 A1 | 10/2015 | van de Ven et al. | |
| 2015/0351187 A1* | 12/2015 | McBryde | H05B 47/19 315/185 R |
| 2015/0377695 A1 | 12/2015 | Chang et al. | |
| 2015/0382425 A1* | 12/2015 | Lewis | G01J 1/4257 315/307 |
| 2017/0105260 A1 | 4/2017 | Ho et al. | |
| 2018/0084617 A1* | 3/2018 | Zhang | A61N 5/0616 |
| 2018/0160491 A1 | 6/2018 | Biery et al. | |

FOREIGN PATENT DOCUMENTS

| | | |
|---|---|---|
| CN | 1573881 | 2/2005 |
| CN | 1596054 A | 3/2005 |
| CN | 1650673 | 8/2005 |
| CN | 1830096 A | 9/2006 |
| CN | 1849707 | 10/2006 |
| CN | 101083866 | 12/2007 |
| CN | 101150904 | 3/2008 |
| CN | 101331798 | 12/2008 |
| CN | 101458067 | 6/2009 |
| CN | 101772988 A | 7/2010 |
| CN | 102422711 A | 4/2012 |
| CN | 102573214 A | 7/2012 |
| CN | 102625944 A | 8/2012 |
| CN | 102695332 A | 9/2012 |
| CN | 103718005 A | 4/2014 |
| DE | 102007036978 | 2/2009 |
| EP | 0196347 | 10/1986 |
| EP | 0456462 | 11/1991 |
| EP | 0677983 A2 | 10/1995 |
| EP | 1482770 | 12/2004 |
| EP | 2273851 | 1/2011 |
| GB | 2307577 | 5/1997 |
| JP | 06-302384 | 10/1994 |
| JP | 08-201472 | 8/1996 |
| JP | 11-025822 | 1/1999 |
| JP | 2001-514432 | 9/2001 |
| JP | 2004-325643 | 11/2004 |
| JP | 2005-539247 | 12/2005 |
| JP | 2006-260927 | 9/2006 |
| JP | 2007-266974 | 10/2007 |
| JP | 2007-267037 | 10/2007 |
| JP | 2008-507150 | 3/2008 |
| JP | 2008-300152 | 12/2008 |
| JP | 2009-134877 | 6/2009 |
| WO | 00/37904 | 6/2000 |
| WO | 03/075617 | 9/2003 |
| WO | 2005/024898 | 3/2005 |
| WO | 2007004108 | 1/2007 |
| WO | 2007/069149 | 6/2007 |
| WO | 2008/065607 | 6/2008 |
| WO | 2008/129453 | 10/2008 |
| WO | 2010/124315 | 11/2010 |
| WO | 2011016860 A1 | 2/2011 |
| WO | 2012/005771 | 1/2012 |
| WO | 2012/042429 | 4/2012 |
| WO | 2013041109 A1 | 3/2013 |
| WO | 2013/142437 | 9/2013 |

OTHER PUBLICATIONS

Kebemou, "A Partitioning-Centric Approach for the Modeling and the Methodical Design of Automotive Embedded System Architectures," Dissertation of Technical University of Berlin, 2008, 176 pages.
O'Brien et al., "Visible Light Communications and Other Developments in Optical Wireless," Wireless World Research Forum, 2006, 26 pages.
Zalewski et al., "Safety Issues in Avionics and Automotive Databuses," IFAC World Congress, Jul. 2005, 6 pages.
"Visible Light Communication: Tutorial," Project IEEE P802.15 Working Group for Wireless Personal Area Networks (WPANs), Mar. 2008.
Johnson, "Visibile Light Communications," CTC Tech Brief, Nov. 2009, 2 pages.
Chonko, "Use Forward Voltage Drop to Measure Junction Temperature," © 2013 Penton Media, Inc., 5 pages.
"Color Management of a Red, Green, and Blue LED Combinational Light Source," Avago Technologies, Mar. 2010, pp. 1-8.
"LED Fundamentals, How to Read a Datasheet (Part 2 of 2) Characteristic Curves, Dimensions and Packaging," Aug. 19, 2011, OSRAM Opto Semiconductors, 17 pages.
Bouchet et al., "Visible-light communication system enabling 73 Mb/s data streaming," IEEE Globecom Workshop on Optical Wireless Communications, 2010, pp. 1042-1046.
RE1 filed as reissue U.S Appl. No. 16/282,231, filed Feb. 21, 2019.
RE1 filed as reissue U.S. Appl. No. 16/033,917, filed Jul. 12, 2018.
RE1 filed as reissue U.S. Appl. No. 16/205,071, filed Nov. 29, 2018.
RE1 filed as reissue U.S. Appl. No. 15/970,436, filed May 3, 2018.
RE1 filed as reissue U.S. Appl. No. 15/982,681, filed May 17, 2018.
CT1 filed as U.S. Appl. No. 16/819,497, filed Mar. 16, 2020.
"Final Office Action for U.S. Appl. No. 12/803,805 dated Jun. 23, 2015".
"Final Office Action for U.S. Appl. No. 13/773,322, dated Sep. 2, 2015".
"Final Office Action dated Jan. 28, 2015 for U.S. Appl. No. 12/806,117", 23 pages.
"Final Office Action dated Jul. 9, 2013 for U.S. Appl. No. 12/806,118", 30 pages.
"Final Office Action dated Jun. 14, 2013 for U.S. Appl. No. 12/806,117", 23 pages.
"Final Office Action dated Jun. 18, 2014 for U.S. Appl. No. 13/231,077", 47 pages.
"Final Office Action dated Nov. 28, 2011 for U.S. Appl. No. 12/360,467", 17 pages.
"Final Office Action dated Oct. 11, 2012 for U.S. Appl. No. 12/806,121", 24 pages.
"Final Office Action dated Sep. 12, 2012 for U.S. Appl. No. 12/584,143", 16 pages.
"International Search Report & Written Opinion for PCT/US2010/000219 dated Oct. 12, 2010".
"International Search Report & Written Opinion for PCT/US2012/052774 dated Feb. 4, 2013".
"International Search Report & Written Opinion dated Sep. 19, 2012 for PCT/US2012/045392".
"International Search Report & Written Opinion, PCT/US2010/001919, dated Feb. 24, 2011".
"International Search Report & Written Opinion, PCT/US2010/002171, dated Nov. 24, 2010".
"International Search Report & Written Opinion, PCT/US2010/004953, dated Mar. 22, 2010".
"International Search Report & Written Opinion, PCT/US2013/027157, dated May 16, 2013".
"International Search Report and the Written Opinion for PCT/US2015/035081 dated Jan. 26, 2016".
"International Search Report and the Written Opinion for PCT/US2015/045252 dated Jan. 26, 2016".
"International Search Report and Written Opinion for PCT/US2014/068556 dated Jun. 22, 2015".
"International Search Report and Written Opinion for PCT/US2015/037660 dated Oct. 28, 2015".
"Notice of Allowance for U.S. Appl. No. 12/806,117 dated Nov. 18, 2015", 18 pages.

(56) References Cited

OTHER PUBLICATIONS

"Notice of Allowance for U.S. Appl. No. 13/970,944 dated Sep. 11, 2015", 10 pages.
"Notice of Allowance for U.S. Appl. No. 14/097,355 dated Mar. 30, 2015", 9 pages.
"Notice of Allowance for U.S. Appl. No. 14/510,212 dated May 22, 2015", 12 pages.
"Notice of Allowance for U.S. Appl. No. 14/510,243 dated Nov. 6, 2015", 9 pages.
"Notice of Allowance for U.S. Appl. No. 14/604,881 dated Oct. 9, 2015", 8 pages.
"Notice of Allowance for U.S. Appl. No. 14/604,886 dated Sep. 25, 2015", 8 pages.
"Notice of Allowance dated Aug. 21, 2014 for U.S. Appl. No. 12/584,143", 5 pages.
"Notice of Allowance dated Feb. 21, 2014 for U.S. Appl. No. 12/806,118", 9 pages.
"Notice of Allowance dated Feb. 25, 2013 for U.S. Appl. No. 12/806,121", 11 pages.
"Notice of Allowance dated Feb. 4, 2013 for U.S. Appl. No. 12/806,113", 9 Pages.
"Notice of Allowance dated Jan. 20, 2012 for U.S. Appl. No. 12/360,467", 5 pages.
"Notice of Allowance dated Jan. 28, 2014 for U.S. Appl. No. 13/178,686", 10 pages.
"Notice of Allowance dated May 3, 2013 for U.S. Appl. No. 12/806,126", 6 pages.
"Notice of Allowance dated Oct. 15, 2012 for U.S. Appl. No. 12/806,113", 8 pages.
"Notice of Allowance dated Oct. 31, 2013 for U.S. Appl. No. 12/924,628", 10 pages.
"Office Action for JP Application 2012-523605 dated Mar. 11, 2014".
"Office Action for JP Application 2012-523605 dated Sep. 24, 2014".
"Office Action for U.S. Appl. No. 12/806,117 dated May 27, 2015", 20 pages.
"Office Action for U.S. Appl. No. 13/970,964 dated Jun. 29, 2015", 17 pages.
"Office Action for U.S. Appl. No. 13/970,990 dated Aug. 20, 2015", 8 pages.
"Office Action for U.S. Appl. No. 14/305,456 dated Apr. 8, 2015", 9 pages.
"Office Action for U.S. Appl. No. 14/305,472 dated Mar. 25, 2015", 12 pages.
"Office Action for U.S. Appl. No. 14/510,243 dated Jul. 28, 2015", 8 pages.
"Office Action for U.S. Appl. No. 14/510,266 dated Jul. 31, 2015", 10 pages.
"Office Action for U.S. Appl. No. 14/510,283 dated Jul. 29, 2015", 9 pages.
"Office Action for U.S. Appl. No. 14/573,207 dated Nov. 4, 2015", 23 pages.
"Office Action dated Apr. 22, 2014 for U.S. Appl. No. 12/806,114", 16 pages.
"Office Action dated Aug. 2, 2012 for U.S. Appl. No. 12/806,114", 14 pages.
"Office Action dated Dec. 17, 2012 for U.S. Appl. No. 12/806,118", 29 pages.
"Office Action dated Dec. 4, 2013 for U.S. Appl. No. 12/803,805", 19 pages.
"Office Action dated Feb. 1, 2012 for U.S. Appl. No. 12/584,143", 12 pages.
"Office Action dated Feb. 17, 2015 for JP Application 2012-520587".
"Office Action dated Feb. 2, 2015 for ON Application 201080035731.X".
"Office Action dated Jul. 1, 2014 for JP Application 2012-520587".
"Office Action dated Jul. 10, 2012 for U.S. Appl. No. 12/806,113", 11 pages.
"Office Action dated Jul. 11, 2012 for U.S. Appl. No. 12/806,121", 23 pages.
"Office Action dated Jun. 10, 2013 for U.S. Appl. No. 12/924,628", 9 pages.
"Office Action dated Jun. 23, 2014 for U.S. Appl. No. 12/806,117".
"Office Action dated Jun. 27, 2013 for U.S. Appl. No. 13/178,686".
"Office Action dated Mar. 6, 2015 for U.S. Appl. No. 13/773,322", 30 pages.
"Office Action dated May 12, 2011 for U.S. Appl. No. 12/360,467", 19 pages.
"Office Action dated Nov. 4, 2013 for CN Application No. 201080032373.7".
"Office Action dated Nov. 12, 2013 for U.S. Appl. No. 13/231,077", 31 pages.
"Office Action dated Oct. 2, 2012 for U.S. Appl. No. 12/806,117", 22 pages.
"Office Action dated Oct. 24, 2013 for U.S. Appl. No. 12/806,117", 19 pages.
"Office Action dated Oct. 9, 2012 for U.S. Appl. No. 12/806,126", 6 pages.
"Office Action dated Sep. 10, 2014 for U.S. Appl. No. 12/803,805", 28 pages.
"Partial International Search Report for PCT/US2014/068556 dated Mar. 27, 2015".
"Partial International Search Report for PCT/US2015/037660 dated Aug. 21, 2015".
"Partial International Search Report for PCT/US2015/045252 dated Nov. 18, 2015".
"Partial International Search Report dated Nov. 16, 2012 for PCT/US2012/052774".
CN 1596054, Cite No. 19, US 7391406, Cite No. 3.
CN 1830096, Cite No. 20, US 7656374, Cite No. 5.
CN 102695332, Cite No. 21, US 8659237, Cite No. 13.

\* cited by examiner

CALIBRATION PROCEDURE FOR A LIGHT-EMITTING DIODE LIGHT SOURCE

CROSS-REFERENCE TO RELATED APPLICATIONS

This application claims the benefit of U.S. Provisional Patent Application No. 62/688,746, filed Jun. 22, 2018, and U.S. Provisional Patent Application No. 62/689,642, filed Jun. 25, 2018, the entire disclosures of which are hereby incorporated by reference.

BACKGROUND

Lamps and displays using efficient light sources, such as light-emitting diodes (LED) light sources, for illumination are becoming increasingly popular in many different markets. LED light sources provide a number of advantages over traditional light sources, such as incandescent and fluorescent lamps. For example, LED light sources may have a lower power consumption and a longer lifetime than traditional light sources. In addition, the LED light sources may have no hazardous materials, and may provide additional specific advantages for different applications. When used for general illumination, LED light sources provide the opportunity to adjust the color (e.g., from white, to blue, to green, etc.) or the color temperature (e.g., from warm white to cool white) of the light emitted from the LED light sources to produce different lighting effects.

A multi-colored LED illumination device may have two or more different colors of LED emission devices (e.g., LED emitters) that are combined within the same package to produce light (e.g., white or near-white light). There are many different types of white light LED light sources on the market, some of which combine red, green, and blue (RGB) LED emitters; red, green, blue, and yellow (RGBY) LED emitters; phosphor-converted white and red (WR) LED emitters; red, green, blue, and white (RGBW) LED emitters, etc. By combining different colors of LED emitters within the same package, and driving the differently-colored emitters with different drive currents, these multi-colored LED illumination devices may generate white or near-white light within a wide gamut of color points or correlated color temperatures (CCTs) ranging from warm white (e.g., approximately 2600K-3700K), to neutral white (e.g., approximately 3700K-5000K) to cool white (e.g., approximately 5000K-8300K). Some multi-colored LED illumination devices also may enable the brightness (e.g., intensity or dimming level) and/or color of the illumination to be changed to a particular set point. These tunable illumination devices may all produce the same color and color rendering index (CRI) when set to a particular dimming level and chromaticity setting (e.g., color set point) on a standardized chromaticity diagram.

SUMMARY

As described herein a lighting device, such a controllable light-emitting diode (LED) light source, may execute a calibration procedure (e.g., a self calibration procedure) to compensate for changes to an optical system of the lighting device that may have occurred after an initial calibration procedure (e.g., a factory calibration procedure) during manufacturing of the lighting device. For example, the self calibration procedure may be executed to compensate for changes to the optical system that may have occurred during assembly of the lighting device (e.g., at an installation site of the lighting device). The lighting device may include an emitter configured to emit light, a detector configured to generate a detector signal in response to detected light, a memory configured to store a curve defining an optical compensation value with respect to a measured forward voltage of the detector, and a control circuit configured to receive a measured value of a luminous flux of the light emitted by the emitter, and adjust the optical compensation value based on the measured forward voltage of the detector. The measured value of the luminous flux may be determined in response to the detector signal and based the optical compensation value. The control circuit may execute the self calibration procedure to determine an expected value of the luminous flux at the measured forward voltage of the detector, and adjust the curve defining the optical compensation value in response to a difference between the expected value and the measured value of the luminous flux.

The emitter and the detector may be mounted to a substrate and encapsulated by a dome. The emitter, the detector, the substrate, and the lens may form the optical system of the lighting device, and the optical compensation value may be dependent upon characteristics of the optical system. The emitter may emit light through the dome and the detector may generate the detector signal in response to a portion of the light that emitted by the emitter and reflected off the dome to the detector. The optical compensation value defines a relationship between a luminous flux of the light emitted through the dome by the emitter and a magnitude of the detector signal.

The lighting device may be assembled at the installation site, and changes to the optical system (e.g., such as contaminants left on the dome of lighting device) may affect the operation of lighting device. The control circuit of the lighting device may be configured to execute the self calibration procedure when the lighting device is first powered on after the lighting device is assembly at the installation site (e.g., when the age of the lighting device is zero). The control circuit may determine an offset value (e.g., that may be equal to the difference between the expected value and the measured value of the luminous flux), and may add the offset value to the curve defining an optical compensation value with respect to a measured forward voltage of the detector. The control circuit of the lighting device may be configured to execute the self calibration procedure after the lighting device has been running for some time (e.g., when the age of the lighting device is not zero). For example, the control circuit may be configured to determine an age of the lighting device, and to determine the expected value of the luminous flux at the measured forward voltage of the detector based on the age of the lighting device, prior to adjusting the curve defining the optical compensation value in response to a difference between the expected value and the measured value of the luminous flux.

DETAILED DESCRIPTION

Figure 1:
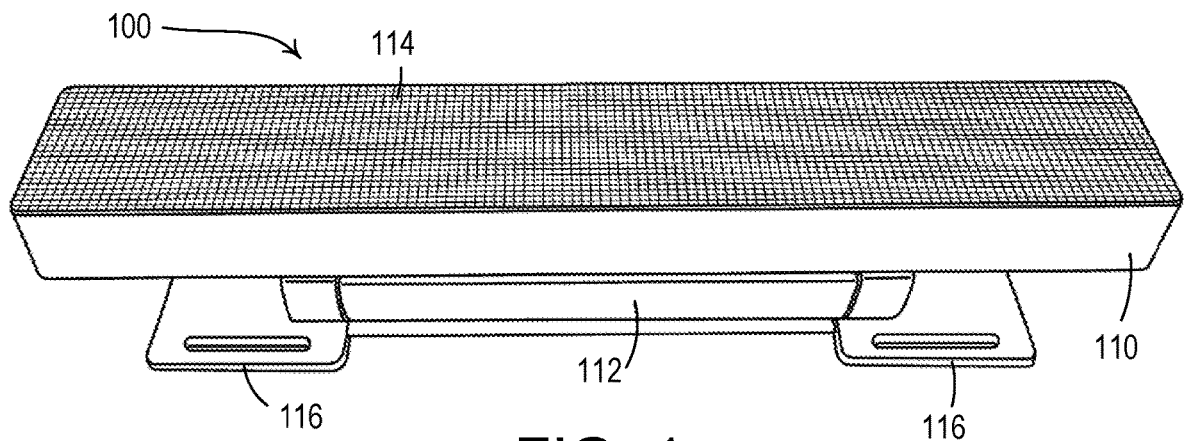
FIG. 1 is a simplified perspective view of an example linear light source.
Figure 2:
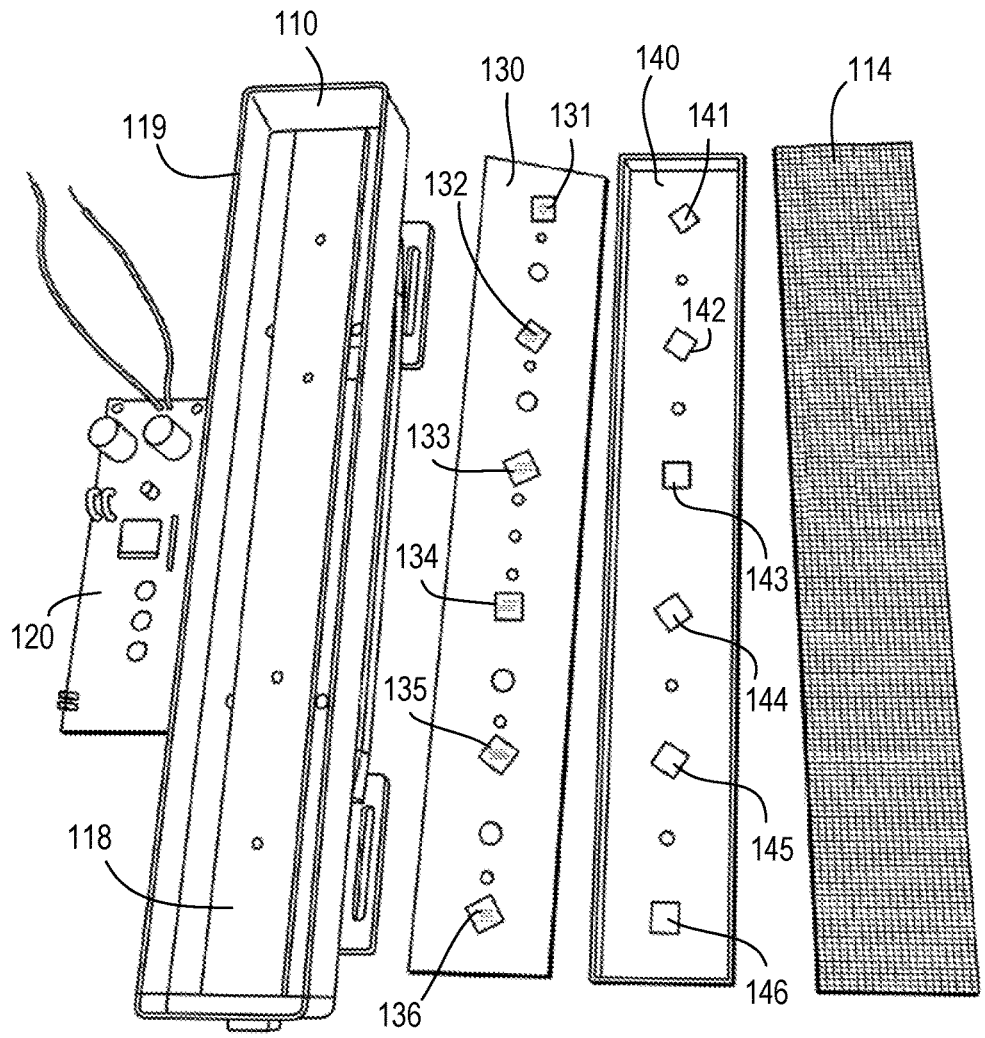
FIG. 2 is an exploded view of the linear light source of FIG. 1.

FIG. 1 is a simplified perspective view of an example illumination device, such as a linear light source 100 (e.g., a linear LED light source). The linear light source 100 may comprise an emitter housing 110, a control housing 112, a lens 114, and mounting brackets 116. FIG. 2 is an exploded view of the linear light source 100. The linear light source 100 may further comprise a control printed circuit board (PCB) 120, an emitter PCB 130, and a reflector 140 (e.g., a 120×120 degree reflector). The linear light source 100 may comprise one or more emitter modules 131-136 (e.g., six emitter modules) mounted to the emitter PCB 130, for example, aligned linearly as shown in FIG. 2. For example, the emitter modules 131-136 may be equally spaced apart, e.g., approximately two inches apart. Although the emitter PCB 130 is depicted in FIG. 2 with six emitter modules linearly aligned and equally spaced apart, the emitter PCB could have any number of emitter modules in any alignment and spaced apart by any distance.

The emitter modules 131-136 may be oriented at angles with respect to each other. For example, each adjacent emitter module 131-136 may be rotated approximately 120 degrees with respect to the adjacent emitter modules. The orientations of the emitter modules 131 and 134 (e.g., a first set of emitter modules) may be the same, the orientations of the emitter modules 132 and 135 (e.g., a second set of emitter modules) may be the same, and the orientations of emitter modules 133 and 136 (e.g., a third set of emitter modules) may be the same. The orientations of the second set of emitter modules 132 and 135 may be rotated 120 degrees from the orientations of the first set of emitter modules 131 and 134. Likewise, the orientations of the third set of emitter modules 133 and 136 may be rotated 120 degrees from the orientations of the second set of emitter modules 132 and 135, and 240 degrees from the orientations of the first set of emitter modules 131 and 134. The rotated orientations of the emitter modules 131-136 may enable the various colors of light produced by the plurality of emitter modules 131-136 to thoroughly mix. The emitter modules 131-136 may be rotated such that the pattern of rotations may be repeated if another linear light source is mounted adjacent to the linear light source 100 (e.g., with a first emitter module 131 of the additional linear light source located adjacent to the last emitter module 136 of the linear light source 100).

The emitter PCB 130 may be mounted in a recess 118 in the emitter housing 110. The reflector 140 may be mounted over (e.g., cover) the emitter PCB 130 and the emitter modules 131-136 may be received in respective openings 141-146 (e.g., square openings) in the reflector 140. The openings 141-146 of the reflector 140 may be slightly larger than the respective emitter modules 131-136 and may be rotated in similar orientations as the respective emitter modules 131-136. The lens 114 may be mounted above the reflector 140 and attached to sidewalls 119 of the emitter housing 110.

The control PCB 120 may be housed in the control housing 112 and may be electrically connected to the emitter PCB 130. The drive PCB 120 may be electrically connected to an external power source, such as an alternating-current (AC) power source, and may comprise one or more drive circuit and/or one or more control circuits for controlling the amount of power delivered to the emitter modules on the emitter PCB 130.

In some installations, such as an office building, the linear light source 100 may have a long length, for example, to extend across a large open office area. If the length of the linear light source 100 is too long to be shipped in final form, the linear light source may be shipped as multiple light sources and assembled at the installation site. For example, multiple emitter PCBs 130 may be connected together, installed in the respective emitter housings 110, and then finally enclosed by the respective lenses 114.

Figure 3:
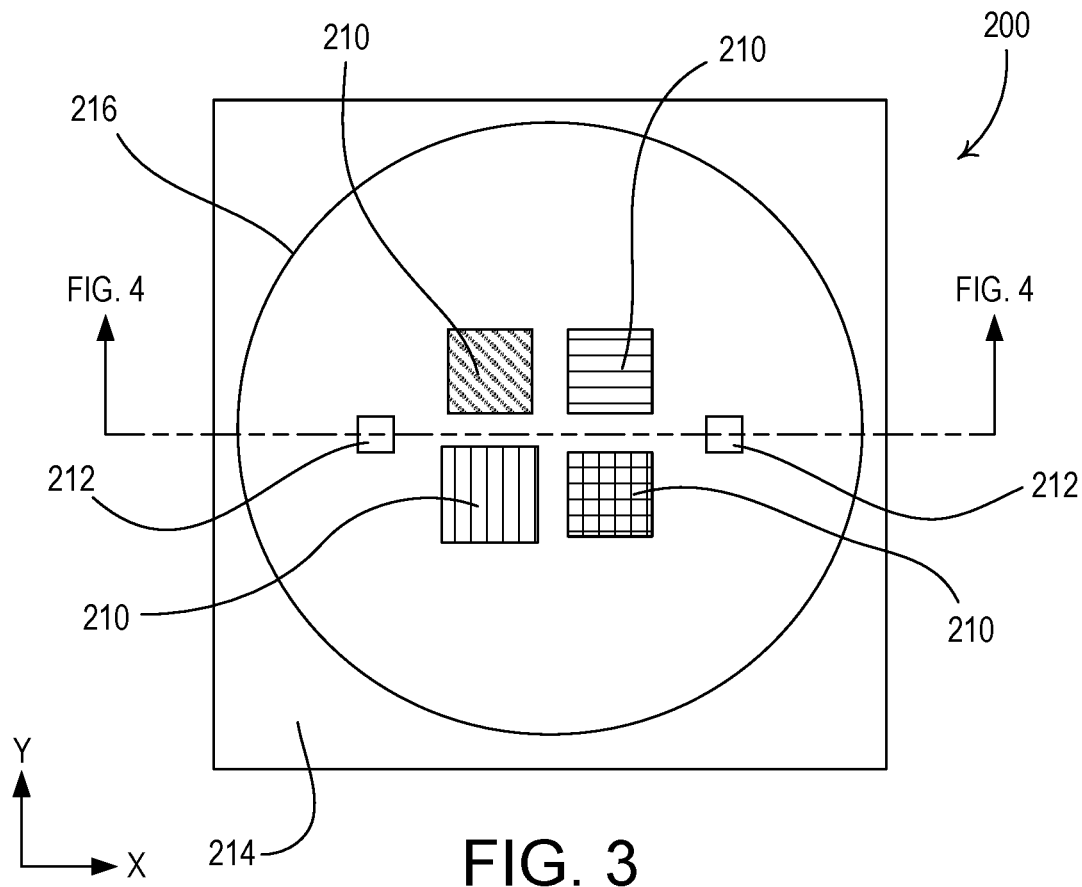
FIG. 3 is a top view of an example emitter module.
Figure 4:
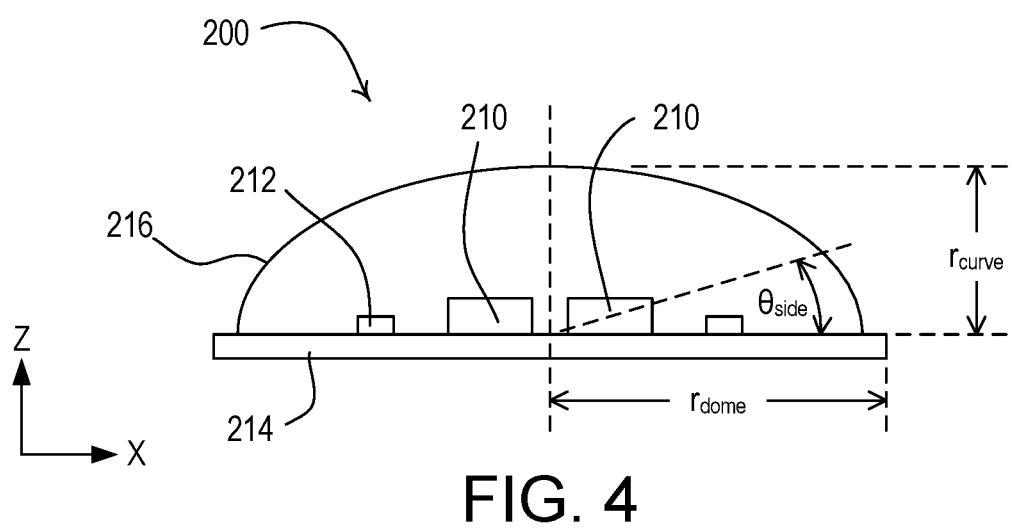
FIG. 4 is a side cross-sectional view of the emitter module of FIG. 3.

FIG. 3 is a top view of an example emitter module 200 (e.g., one of the emitter modules 131-136 of the linear light source 100). FIG. 4 is a side cross-section view of the emitter module 200 taken through the center of the emitter module (e.g., through the line shown in FIG. 3). The emitter module 200 may comprise an array of four emitters 210 (e.g., emission LEDs) and two detectors 212 (e.g., detection LEDs) mounted on a substrate 214 and encapsulated by a dome 216. The emitters 210, the detectors 212, the substrate 214, and the dome 216 may form an optical system. The emitters 210 may each emit light of a different color (e.g., red, green, blue, and white or amber), and may be arranged in a square array as close as possible together in the center of the dome 126, so as to approximate a centrally located point source. The detectors 212 may be any device that produces current indicative of incident light, such as a silicon photodiode or an LED. For example, the detectors 212 may each be an LED having a peak emission wavelength in the range of approximately 550 nm to 700 nm, such that the detectors 212 may not produce photocurrent in response to infrared light (e.g., to reduce interference from ambient light). For example, a first one of the detectors 212 may comprise a small red, orange or yellow LED, which may be used to measure a luminous flux of the light emitted by the red LED of the emitters 210. A second one of the detectors 212 may comprise a green LED, which may be used to measure a respective luminous flux of the light emitted by each of the green and blue LEDs of the emitters 210. Both of the detectors 212 may be used to measure the luminous flux of the white LED of the emitters 210 at different wavelengths (e.g., to characterize the spectrum of the light emitted by the white LED).

The substrate 214 of the emitter module 200 may be a ceramic substrate formed from an aluminum nitride or an aluminum oxide material, or some other reflective material, and may function to improve output efficiency of the emitter module 200 by reflecting light out of the emitter module through the dome 216. The dome 216 may comprise an optically transmissive material, such as silicon or the like, and may be formed through an over-molding process, for example. A surface of the dome 216 may be lightly textured to increase light scattering and promote color mixing, as well as to reflect a small amount of the emitted light back toward the detectors 212 mounted on the substrate 214 (e.g., about 5%). The size of the dome 216 (e.g., a diameter of the dome in a plane of the LEDs 210) may be generally dependent on the size of the LED array. The diameter of the dome may be substantially larger (e.g., about 1.5 to 4 times larger) than the diameter of the array of LEDs 210 to prevent occurrences of total internal reflection.

The size and shape (e.g., curvature) of the dome 216 may also enhance color mixing when the emitter module 200 is mounted near other emitter modules (e.g., in a similar manner as the emitter modules 131-136 mounted to the emitter PCB 130 of the linear light source 100). For example, the dome 216 may be a flat shallow dome as shown in FIG. 4. A radius $r_{dome}$ of the dome 216 in the plane of the emitters 210 array may be, for example, approximately 20-30% larger than a radius of curvature $r_{curve}$ of the dome 216. For example, the radius $r_{dome}$ of the shallow dome 216 in the plane of the LEDs may be approximately 4.8 mm and the radius $r_{curve}$ of the dome curvature (e.g., the maximum height of the dome above the plane of the LEDs) may be approximately 3.75 mm. Alternatively, the dome 216 may have a hemispherical shape. In addition, one skilled in the art would understand that alternative radii and ratios may be used to achieve the same or similar color mixing results.

By configuring the dome 216 with a substantially flatter shape, the dome 216 allows a larger portion of the emitted light to emanate sideways from the emitter module 200 (e.g., in an X-Y plane as shown in FIGS. 3 and 4). Stated another way, the shallow shape of the dome 216 allows a significant portion of the light emitted by the emitters 210 to exit the dome at small angles ° side relative to the horizontal plane of the array of emitters. For example, the dome 216 may allow approximately 40% of the light emitted by the array of emitters 210 to exit the dome at approximately 0 to 30 degrees relative to the horizontal plane of the array of emitters. When the emitter module 200 is mounted near other emitter modules (e.g., as in the linear light source 100), the shallow shape of the dome 216 may improve color mixing in the linear light source by allowing a significant portion (e.g., 40%) of the light emitted from the sides of adjacent emitter modules to intermix before that light is reflected back out of the linear light source. Examples of emitter modules, such as the emitter module 200, are described in greater detail in U.S. Pat. No. 10,161,786, issued Dec. 25, 2018, entitled EMITTER MODULE FOR AN LED ILLUMINATION DEVICE, the entire disclosure of which is hereby incorporated by reference.

When the emitter module 200 is included in a light source that may be assembled at the installation site (e.g., such as the linear light source 100 shown in FIGS. 1 and 2), the optical system of the emitter module may be susceptible to changes in operation due to the assembly process. For example, contaminants (e.g., fingerprints, smudges, dust, dirt, etc.) may be left on the dome 216 after assembly, which may affect how the light emitted by the emitters 210 may be reflected back to the detectors 212 and thus affect the determined luminous flux for the emitters. The linear light source 100 may be configured to execute a calibration procedure (e.g., a self-calibration procedure or a field calibration procedure) after assembly of the linear light source (e.g., in the field at the installation site) to compensate for changes to the optical system that may have occurred during assembly of the linear light source.

Figure 5:
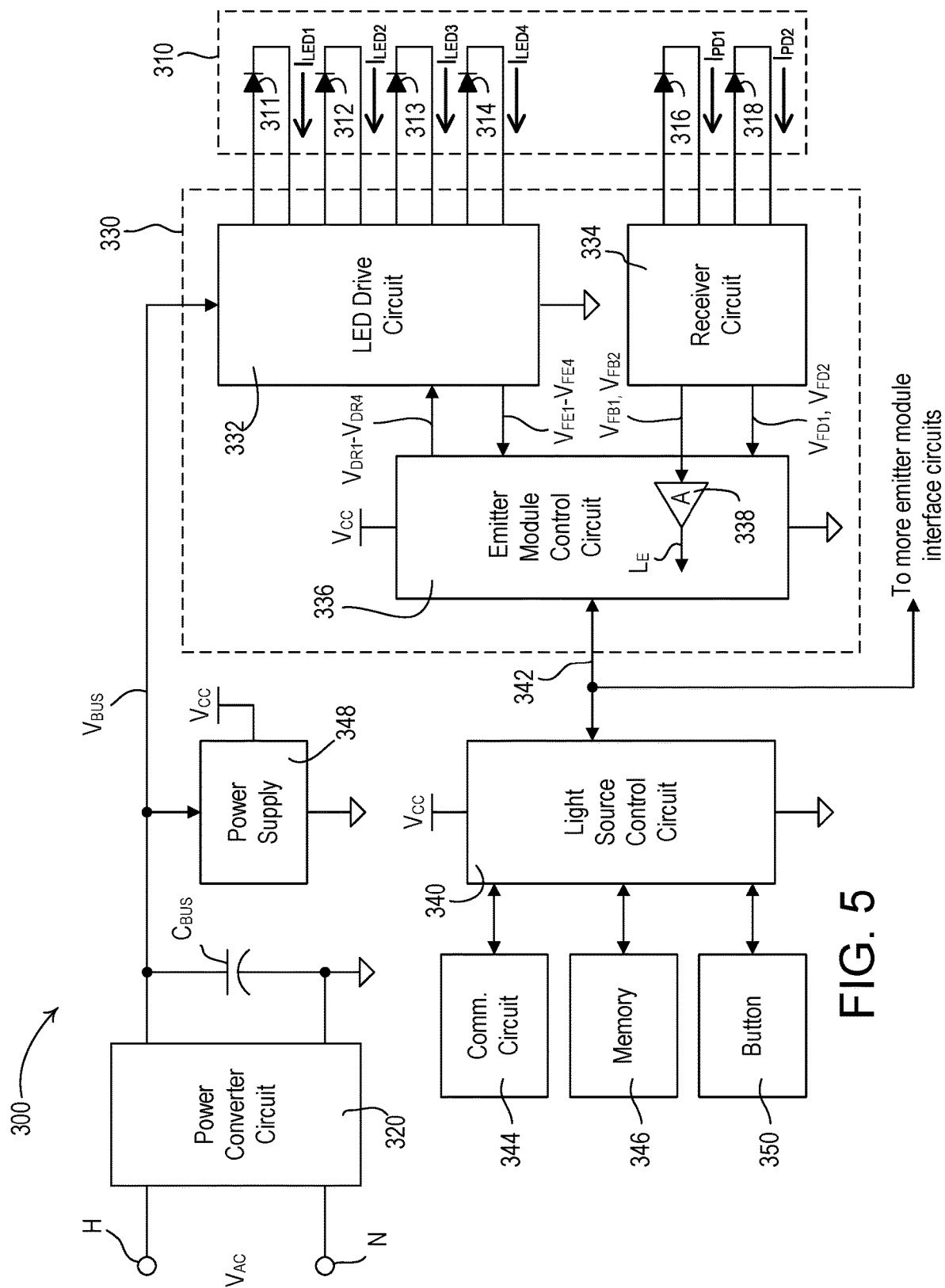
FIG. 5 is a simplified block diagram of a controllable lighting device.

FIG. 5 is a simplified block diagram of a controllable electrical device, such as a controllable lighting device 300 (e.g., the linear light source 100 shown in FIGS. 1 and 2). The controllable lighting device 300 may comprise one or more emitter modules 310 (e.g., the emitter modules 200 shown in FIGS. 3 and 4). Each emitter module 310 may comprise one or more emitters 311, 312, 313, 314. For example, the first emitter 311 may be a red LED, the second emitter 312 may be a blue LED, the third emitter 313 may be a green LED, and the fourth emitter 314 may be a white or amber LED. The emitters 311-314 may be controlled to adjust an intensity (e.g., a luminous flux) and/or a color (e.g., a color temperature) of a cumulative light output of the controllable lighting device 300. The emitters 311-314 are each shown in FIG. 5 as a single LED, but each emitter may comprise a plurality of LEDs connected in series (e.g., a chain of LEDs), a plurality of LEDs connected in parallel, or a suitable combination thereof, depending on the particular lighting system. In addition, each emitter 311-314 may comprise one or more organic light-emitting diodes (OLEDs). The emitter module 310 may also comprise one or more detectors 316, 318 (e.g., photodiodes, such as a red LED and a green LED) that may produce respective photodiode currents $I_{PD1}$, $I_{PD2}$ (e.g., detector signals) in response to incident light.

The controllable lighting device 300 may comprise a power converter circuit 320, which may receive a source voltage, such as an alternating-current (AC) mains line voltage $V_{AC}$ from an AC power source (not shown), via a hot connection H and a neutral connection N, and generate a direct-current (DC) bus voltage $V_{BUS}$ (e.g., approximately 15-20V) across a bus capacitor $C_{BUS}$. The power converter circuit 320 may comprise, for example, a boost converter, a buck converter, a buck-boost converter, a flyback converter, a single-ended primary-inductance converter (SEPIC), a Ćuk converter, or any other suitable power converter circuit for generating an appropriate bus voltage. The power converter circuit 320 may provide electrical isolation between the AC power source and the emitters 311-314, and may operate as a power factor correction (PFC) circuit to adjust the power factor of the controllable lighting device 300 towards a power factor of one.

The controllable lighting device 300 may comprise one or more emitter module interface circuits 330 (e.g., one emitter module interface circuit per emitter module 310 in the controllable lighting device 300). The emitter module interface circuit 330 may comprise an LED drive circuit 332 for controlling (e.g., individually controlling) the power delivered to and the luminous flux of the light emitted of each of the emitters 311-314 of the respective emitter module 310. The LED drive circuit 332 may receive the bus voltage $V_{BUS}$ and may adjust magnitudes of respective LED drive currents $I_{LED1}$, $I_{LED2}$, $I_{LED3}$, $I_{LED4}$ conducted through the LED light sources 311-314. The LED drive circuit 332 may comprise one or more regulation circuits (e.g., four regulation circuits), such as switching regulators (e.g., buck converters) for controlling the magnitudes of the respective LED drive currents $I_{LED1}$-$I_{LED4}$. An example of the LED drive circuit 332 is described in greater detail in U.S. Pat. No. 9,485,813, issued Nov. 1, 2016, entitled ILLUMINATION DEVICE AND METHOD FOR AVOIDING AN OVER-POWER OR OVER-CURRENT CONDITION IN A POWER CONVERTER, the entire disclosure of which is hereby incorporated by reference.

The emitter module interface circuit 330 may also comprise a receiver circuit 334 that may be electrically coupled to the detectors 316, 318 of the emitter module 310 for generating respective optical feedback signals $V_{FB1}$, $V_{FB2}$ in response to the photodiode currents $I_{PD1}$, $I_{PD2}$. The receiver circuit 334 may comprise one or more trans-impedance amplifiers (e.g., two trans-impedance amplifiers) for converting the respective photodiode currents $I_{PD1}$, $I_{PD2}$ into the optical feedback signals $V_{FB1}$, $V_{FB2}$. For example, the optical feedback signals $V_{FB1}$, $V_{FB2}$ may have DC magnitudes that indicate the magnitudes of the respective photodiode currents $I_{PD1}$, $I_{PD2}$.

The emitter module interface circuit 330 may also comprise an emitter module control circuit 336 for controlling the LED drive circuit 332 to control the intensities of the emitters 311-314 of the emitter module 310. The emitter module control circuit 336 may comprise, for example, a microprocessor, a microcontroller, a programmable logic device (PLD), an application specific integrated circuit (ASIC), a field-programmable gate array (FPGA), or any other suitable processing device or controller. The emitter module control circuit 336 may generate one or more drive signals $V_{DR1}$, $V_{DR2}$, $V_{DR3}$, $V_{DR4}$ for controlling the respective regulation circuits in the LED drive circuit 332. The emitter module control circuit 336 may receive the optical feedback signals $V_{FB1}$, $V_{FB2}$ from the receiver circuit 334 for determining the luminous flux $L_E$ of the light emitted by the emitters 311-314. The emitter module control circuit 336 may have one or more gain compensation circuits 338 that may receive the respective optical feedback signals $V_{FB1}$, $V_{FB2}$ and generate values that indicate the luminous flux $L_E$ of the light emitted by the emitters 311-314.

The emitter module control circuit 336 may also receive a plurality of emitter forward-voltage feedback signals $V_{FE1}$, $V_{FE2}$, $V_{FE3}$, $V_{FE4}$ from the LED drive circuit 332 and a plurality of detector forward-voltage feedback signals $V_{FD1}$, $V_{FD2}$ from the receiver circuit 334. The magnitude of the emitter forward-voltage feedback signals $V_{FE1}$-$V_{FE4}$ may be representative of the magnitudes of the forward voltages of the respective emitters 311-314, which may indicate temperatures $T_{E1}$, $T_{E2}$, $T_{E3}$, $T_{E4}$ of the respective emitters. If each emitter 311-314 comprises multiple LEDs electrically coupled in series, the emitter forward-voltage feedback signals $V_{FE1}$-$V_{FE4}$ may be representative of the magnitude of the forward voltage across a single one of the LEDs or the cumulative forward voltage developed across multiple LEDs in the chain (e.g., all of the series-coupled LEDs in the chain). The detector forward-voltage feedback signals $V_{FD1}$, $V_{FD2}$ may be representative of the magnitudes of the forward voltages of the respective detectors 316-318, which may indicate temperatures $T_{D1}$, $T_{D2}$ of the respective detectors. For example, the detector forward-voltage feedback signals $V_{FD1}$, $V_{FD2}$ may be equal to the forward voltages $V_{FD}$ of the respective detectors 316, 318.

The controllable lighting device 300 may comprise a light source control circuit 340 that may be electrically coupled to the emitter module control circuit 336 of each of the one or more emitter module interface circuits 330 via a communication bus 342 (e.g., an I²C communication bus). The light source control circuit 340 may be configured to control the emitter module interface circuits 330 to control the intensity (e.g., the luminous flux) and/or color of the cumulative light emitted by the controllable lighting device 300. The light source control circuit 340 may comprise, for example, a microprocessor, a microcontroller, a programmable logic device (PLD), an application specific integrated circuit (ASIC), a field-programmable gate array (FPGA), or any other suitable processing device or controller. The light source control circuit 340 may be configured to adjust (e.g., dim) a present intensity $L_{PRES}$ of the cumulative light emitted by the controllable lighting device 300 towards a target intensity $L_{TRGT}$, which may range across a dimming range of the controllable light source, e.g., between a low-end intensity $L_{LE}$ (e.g., a minimum intensity, such as approximately 0.1%-1.0%) and a high-end intensity $L_{HE}$ (e.g., a maximum intensity, such as approximately 100%). The light source control circuit 340 may be configured to adjust a present color temperature $T_{PRES}$ of the cumulative light emitted by the controllable lighting device 300 towards a target color temperature $T_{TRGT}$, which may range between a cool-white color temperature (e.g., approximately 3100-4500 K) and a warm-white color temperature (e.g., approximately 2000-3000 K).

The controllable lighting device 300 may comprise a communication circuit 344 coupled to the light source control circuit 340. The communication circuit 344 may comprise a wireless communication circuit, such as, for example, a radio frequency (RF) transceiver coupled to an antenna for transmitting and/or receiving RF signals. The wireless communication circuit may also be an RF transmitter for transmitting RF signals, an RF receiver for receiving RF signals, or an infrared (IR) transmitter and/or receiver for transmitting and/or receiving IR signals. The communication circuit 344 may be coupled to the hot connection H and the neutral connection N of the controllable lighting device 300 for transmitting a control signal via the electrical wiring using, for example, a power-line carrier (PLC) communication technique. The light source control circuit 340 may be configured to determine the target intensity $L_{TRGT}$ for the controllable lighting device 300 in response to messages (e.g., digital messages) received via the communication circuit 344.

The controllable lighting device 300 may comprise a memory 346 configured to store operational characteristics of the controllable lighting device 300 (e.g., the target intensity $L_{TRGT}$, the target color temperature $T_{TRGT}$, the low-end intensity $L_{LE}$, the high-end intensity $L_{HE}$, etc.). The memory 346 may be implemented as an external integrated circuit (IC) or as an internal circuit of the light source control circuit 340. The controllable lighting device 300 may comprise a power supply 348 that may receive the bus voltage $V_{BUS}$ and generate a supply voltage $V_{CC}$ for powering the light source control circuit 340 and other low-voltage circuitry of the controllable lighting device.

When the controllable lighting device 300 is on, the light source control circuit 340 may be configured to control the emitter modules 310 to emit light substantially all of the time. The light source control circuit 340 may be configured to control the emitter modules 310 to disrupt the normal emission of light to measure one or more operational characteristics of the emitter modules during periodic measurement intervals. For example, during the measurement intervals, the emitter module control circuit 336 may be configured to individually turn on each of the different-colored emitters 311-314 of the emitter modules 310 (e.g., while turning off the other emitters) and measure the luminous flux of the light emitted by that emitter using one of the two detectors 316, 318. For example, the emitter module control circuit 336 may turn on the first emitter 311 of the emitter module 310 (e.g., at the same time as turning off the other emitters 312-314) and determine the luminous flux $L_E$ of the light emitted by the first emitter 311 from the first gain compensation circuit 338 in response to the first optical feedback signal $V_{FB1}$ generated from the first detector 316. In addition, the emitter module control circuit 336 may be configured to drive the emitters 311-314 and the detectors 316, 318 to generate the emitter forward-voltage feedback signals $V_{FE1}$-$V_{FE4}$ and the detector forward-voltage feedback signals $V_{FD1}$, $V_{FD2}$ during the measurement intervals. Methods of measuring the operational characteristics of emitter modules in a light source are described in greater detail in U.S. Pat. No. 9,332,598, issued May 3, 2016, entitled INTERFERENCE-RESISTANT COMPENSATION FOR ILLUMINATION DEVICES HAVING MULTIPLE EMITTER MODULES, the entire disclosure of which is hereby incorporated by reference.

Calibration values for the various operational characteristics of the controllable lighting device 300 may be stored in the memory 346 as part of a calibration procedure performed during manufacturing of the controllable lighting device 300. Calibration values may be stored for each of the emitters 311-314 and/or the detectors 316, 318 of each of the emitter modules 310. For example, calibration values may be stored for measured values of luminous flux (e.g., in lumens), x-chromaticity, y-chromaticity, emitter forward voltage, photodiode current, and detector forward voltage. For example, the luminous flux, x-chromaticity, and y-chromaticity measurements may be obtained from the emitters 311-314 using an external calibration tool, such as a spectrophotometer. The values for the emitter forward voltages, photodiode currents, and detector forward voltages may be measured internally to the controllable lighting device 300. The calibration values for each of the emitters 311-314 and/or the detectors 316, 318 may be measured at a plurality of different drive currents, e.g., at 100%, 30%, and 10% of a maximum drive current for each respective emitter.

In addition, the calibration values for each of the emitters 311-314 and/or the detectors 316, 318 may be measured at a plurality of different operating temperatures. The controllable lighting device 300 may be operated in an environment that is controlled to multiple calibration temperatures and value of the operational characteristics may be measured and stored. For example, the controllable lighting device 300 may be operated at a cold calibration temperature $T_{CAL-COLD}$, such as room temperature (e.g., approximately 25° C.), and a hot calibration temperature $T_{CAL-HOT}$ (e.g., approximately 85° C.). At each temperature, the calibration values for each of the emitters 311-314 and/or the detectors 316, 318 may be measured at each of the plurality of drive currents and stored in the memory 346.

After installation, the light source control circuit 340 of the controllable lighting device 300 may use the calibration values stored in the memory 346 to maintain a constant light output from the emitter modules 310. The light source control circuit 340 may determine target values for the luminous flux to be emitted from the emitters 311-314 to achieve the target intensity $L_{TRGT}$ and/or the target color temperature $T_{TRGT}$ for the controllable lighting device 300. The light source control circuit 340 may determine the magnitudes for the drive currents $I_{DR}$ for each of the emitters 311-314 based on the determined target values for the luminous flux to be emitted from the emitters 311-314. When the age of the controllable lighting device 300 is zero, the magnitudes of each of the drive currents $I_{DR}$ for the emitters 311-314 may be controlled to an initial magnitude $I_{DR-INITIAL}$.

The light output of the emitter modules 310 may decrease as the emitters 311-314 age. The light source control circuit 340 may be configured to increase the magnitudes of the drive current $I_{DR}$ for the emitters 311-314 to adjusted magnitudes $I_{DR-ADJUSTED}$ to achieve the determined target values for the luminous flux of the target intensity $L_{TRGT}$ and/or the target color temperature $T_{TRGT}$. Methods of adjusting the drive currents of emitters to achieve a constant light output as the emitters age are described in greater detail in U.S. Pat. No. 9,769,899, issued Sep. 29, 2017, entitled ILLUMINATION DEVICE AND AGE COMPENSATION METHOD, the entire disclosure of which is hereby incorporated by reference.

The light source control circuit 340 may configure the operation of the emitter module control circuit 336 using the calibration values, such that the luminous flux of the light emitted by one or more of the emitters 311-314 of the emitter modules 310 may be determined from the optical feedback signals $V_{FB1}$, $V_{FB2}$. The temperatures of the detectors 316, 318 may affect the magnitudes of the respective photodiode currents $I_{PD1}$, $I_{PD2}$ and thus the determined luminous flux of the light emitted by one or more of the emitters 311-314. The light source control circuit 340 may also configure the operation of the emitter module control circuit 336 using the detector forward-voltage feedback signals $V_{FD1}$, $V_{FD2}$ to account for the temperatures of the respective detectors 316, 318.

The light source control circuit 340 may be configured to determine one or more optical compensation values (e.g., gains) that define relationships between the luminous flux $L_E$ of the light emitted by the emitters 311-314 and the magnitudes of the photodiode currents $I_{PD1}$, $I_{PD2}$ of the detectors 316, 318 that may be used to measure the luminous flux $L_E$ of the respective emitters. The light source control circuit 340 may be configured to adjust a gain A of each of the gain compensation circuits 338 of the emitter module control circuit 336 depending upon which of the emitters 311-314 is emitting light and which of the detectors 316, 318 is being used to measure the luminous flux of that emitter (e.g., an emitter-detector pair). The light source control circuit 340 may determine the gain A for each of the gain compensation circuits 338 as a function of two gain factors $A_1$ and $A_2$ (e.g., the sum of the gain factors). The gain factors $A_1$ and $A_2$ may each be a function of the measured forward voltage $V_{FD}$ of the detector 316, 318 being used (e.g., which may indicate the temperature $T_D$ of the detector).

The light source control circuit 340 may be configured to determine the gain factors $A_1$ and $A_2$, and thus the gain A to use to measure the luminous flux of one of the emitters 311-314 using one of the detectors 316, 318. For example, the first detector 316 may be used to measure luminous flux $L_E$ of the light emitted by the first emitter 311. The light source control circuit 340 may configure the gain A of the first gain compensation circuit 338 that is receiving the first optical feedback signal $V_{FB1}$. The light source control circuit 340 may receive the forward voltage $V_{FD}$ of the first detector 316 (e.g., as measured by the receiver circuit 334) from the emitter module control circuit 336 via the communication bus 342. The light source control circuit 340 may determine the gain factors $A_1$ and $A_2$ from the measured forward voltage $V_{FD}$ (e.g., using curves stored in memory as will be described in greater detail below). The light source control circuit 340 may then calculate the gain A by adding the gain factors $A_1+A_2$ and configure the first gain compensation circuit 338 of the emitter module control circuit 336 with the calculated gain A. As a result, the output of the gain compensation circuit 338 may represent the luminous flux $L_E$ of the light emitted by the first emitter 311, e.g., $L_E = (A_1+A_2) \cdot V_{FB1}$.

Figure 6:
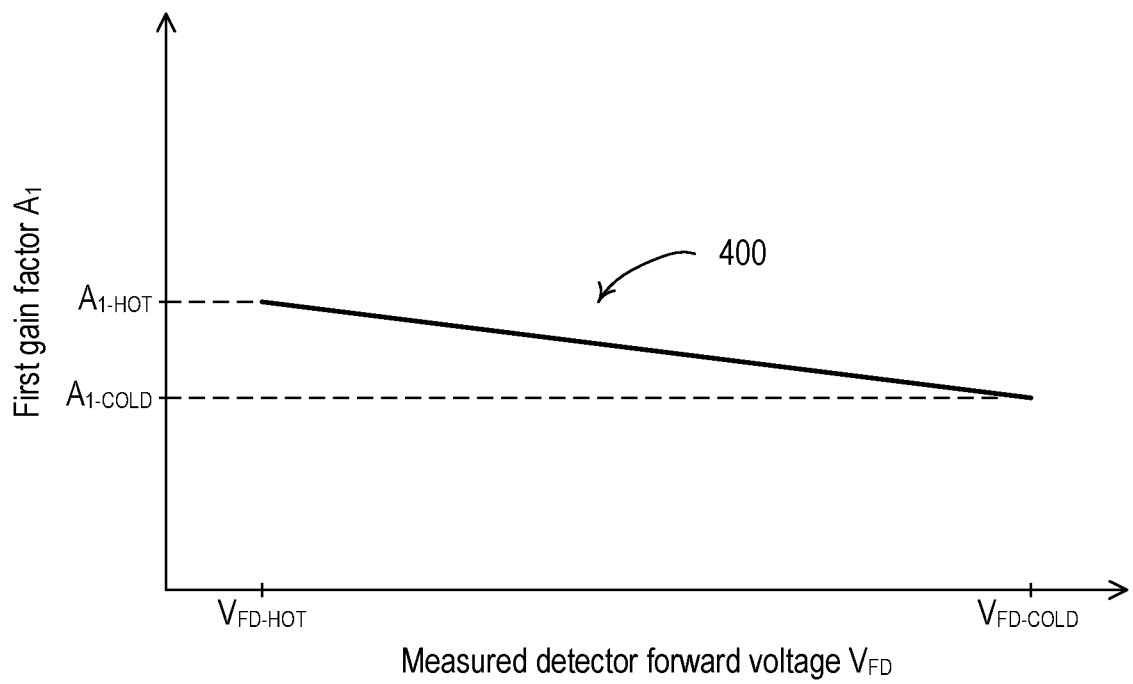
FIGS. 6-9 illustrate plots of various gain factors for gain compensation circuits that receive optical feedback signals from a detector with respect to a forward voltage of the detector.

FIG. 6 is an example first curve 400 that may be stored in the memory 346 and may be used to determine the first gain factor $A_1$ based on the forward voltage $V_{FD}$ of one of the detectors 316, 318. The memory 346 may store a first curve 400 for each of the emitter-detector pairs used to measure the luminous flux $L_E$ of each of the emitters 311-314. For example, storing the first curve 400 may include storing an equation(s) or function(s) that defines the curve, storing two or more values that define the curve, such as storing two or more points along the curve where a point may be defined, e.g., by respective x- and y-coordinates, etc., although one will recognize that the first curve 400 may be stored in the memory 346 in other fashions, such as by storing values that define the first curve 400 in a lookup table in the memory 346. The first curve 400 for determining the first gain factor $A_1$ may be, for example, a line that begins at a hot gain offset value $A_{1\text{-}HOT}$ at a hot detector forward voltage $V_{FD\text{-}HOT}$ and ends at a cold gain offset value $A_{1\text{-}COLD}$ at a cold detector forward voltage $V_{FD\text{-}COLD}$. The hot detector forward voltage $V_{FD\text{-}HOT}$ and the cold detector forward voltage $V_{FD\text{-}COLD}$ may be measured at the hot calibration temperature $T_{CAL\text{-}HOT}$ and the cold calibration temperature $T_{CAL\text{-}COLD}$, respectively, during the calibration procedure. The hot gain offset value $A_{1\text{-}HOT}$ may be determined from the magnitude of a photodiode current $I_{PD}$-HOT of the respective detector 316, 318 and a luminous flux $L_{E\text{-}HOT}$ as measured at the hot calibration temperature $T_{CAL\text{-}HOT}$ during the calibration procedure, e.g., $A_{1\text{-}HOT}=L_{E\text{-}HOT}/I_{PD\text{-}HOT}$. The cold gain offset value $A_{1\text{-}COLD}$ may be determined from the magnitude of a photodiode current $I_{PD\text{-}COLD}$ of the respective detector 316, 318 and a luminous flux $L_{E\text{-}COLD}$ as measured at the cold calibration temperature $T_{CAL}$-COLD during the calibration procedure, e.g., $A_{1\text{-}COLD}=L_{E\text{-}COLD}/I_{PD\text{-}COLD}$. The hot gain offset value $A_{1\text{-}HOT}$ may be associated with a hot detector forward voltage $V_{FD\text{-}HOT}$, which may be measured at the hot calibration temperature $T_{CAL\text{-}HOT}$, and cold gain offset value $A_{1\text{-}COLD}$ may be associated with a cold detector forward voltage $V_{FD\text{-}COLD}$, which may be measured at the cold calibration temperature $T_{CAL\text{-}COLD}$. The first curve 400 may be a linear interpolation between these two points: ($V_{FD\text{-}HOT}$, $A_{1\text{-}HOT}$) and ($V_{FD\text{-}COLD}$, $A_{1\text{-}COLD}$).

Figure 7:
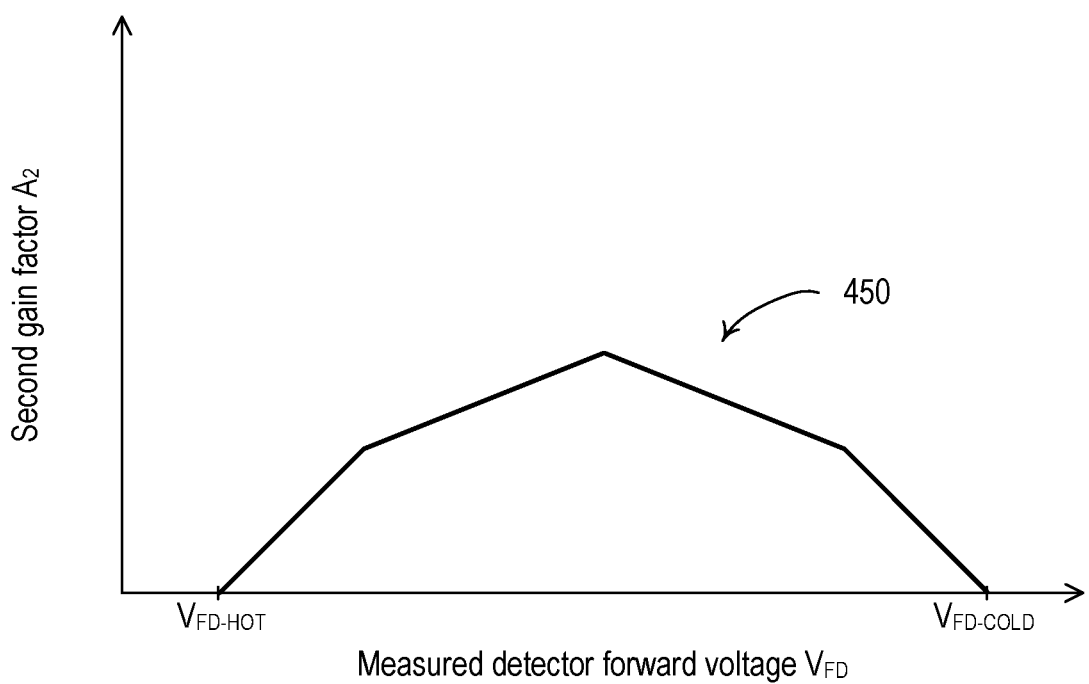
Figure 8:
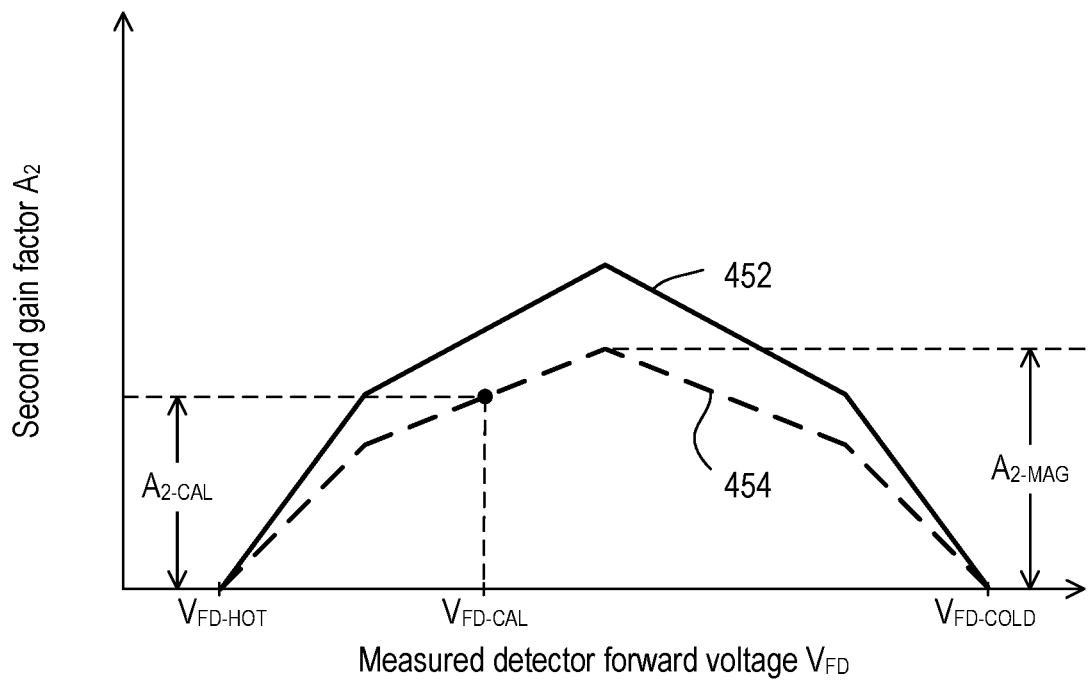

FIG. 7 is an example second curve 450 that may be stored in the memory 346 and may be used to determine the second gain factor $A_2$ based on the forward voltage $V_{FD}$ of one of the detectors 316, 318. The memory 346 may store a second curve 450 for each of the emitter-detector pairs used to measure the luminous flux $L_E$ of each of the emitters 311-314. For example, storing the second curve 450 may include storing an equation(s) or function(s) that defines the curve, storing two or more values that define the curve, such as storing two or more points along the curve where a point may be defined, e.g., by respective x- and y-coordinates, etc., although one will recognize that the second curve 450 may be stored in the memory 346 in other fashions, such as by storing values that define the second curve 450 in a lookup table in the memory 346. The second curve 450 may define, for example, a non-linearity between the magnitude of the photodiode current $I_{PD}$ conducted through the respective detector 316, 318 and the temperature $T_D$ of the respective detector (e.g., the measured forward voltage $V_{FD}$ of the detector). The non-linearity may result from the optical performance of each of the emitter modules 310, for example, how light reflects off of the dome 216 and back to the detectors 212. The second curve 450 may have a characteristic shape that may be based on a nominal curve 452 (e.g., a characteristic curve) as shown in FIG. 8.

The second curve 450 may be characterized by a magnitude $A_{2\text{-}MAG}$, that may be determined during the calibration procedure. For example, during the calibration procedure, the light source control circuit 340 may control one of the emitters (e.g., one of emitters 311-314) to emit light at a predetermined luminous flux $L_{CAL}$ (e.g., a calibration luminous flux), which may cause the emitter module 300 to heat up to an intermediate calibration temperature $T_{CAL}$. The light source control circuit 340 may determine a calibration forward voltage $V_{FD\text{-}CAL}$ of the respective detector 316, 318, which may indicate the calibration temperature $T_{CAL}$. The light source control circuit 340 may also determine the photodiode current $I_{PD}$ of the respective detector 316, 318, and determine a gain $A_{CAL}$ required to cause the output of the respective gain compensation circuit to indicate the predetermined luminous flux $L_{CAL}$. The light source control circuit 340 may also calculate a second gain factor $A_{2\text{-}CAL}$ from the determined gain $A_{CAL}$, e.g., $A_{2\text{-}CAL}=A_{CAL}-A_{1\text{-}CAL}$, where the first gain factor $A_{1\text{-}CAL}$ may be determined from the first curve 400 (e.g., as shown in FIG. 6). The light source control circuit 340 may fit the second curve 450 to cross the determined second gain factor $A_{2\text{-}CAL}$, for example, by scaling the nominal curve 452 to generate a fitted curve 454 as shown in FIG. 8. The magnitude $A_{2\text{-}MAG}$ of the second curve 450 may be determined from the fitted curve 454 and stored in the memory 346.

Figure 9:
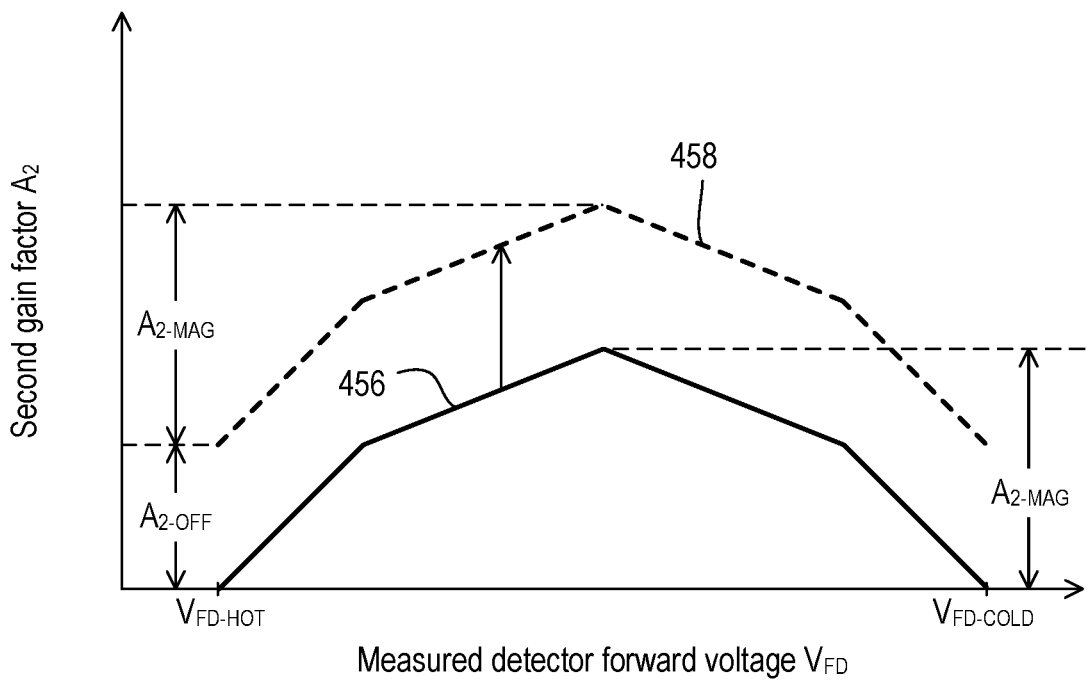

If the controllable lighting device 300 is a linear light source that may be constructed at the installation site, the second curve 450 may also be characterized by an offset value $A_{2\text{-}OFF}$ (e.g., as shown in FIG. 9) after being assembled. After the initial calibration procedure, the offset value $A_{2\text{-}OFF}$ of the second curve 450 may be approximately zero (e.g., as shown in FIGS. 7 and 8). However, contaminants that may reside on the emitter modules 310 after assembly at the installation site may cause the second curve 450 to have the offset value $A_{2\text{-}OFF}$. The light source control circuit 340 may be configured to execute a calibration procedure (e.g., a self calibration procedure) to determine the offset value $A_{2\text{-}OFF}$ and update the second curve 450 as stored in the memory 346. For example, the light source control circuit 340 may be configured to add the offset value $A_{2\text{-}OFF}$ to an initial curve 456 (e.g., which may be the same as the fitted curve 454) to generate an adjusted curve 458 as shown in FIG. 9 (where adding a value to a curve may depend, for example, how the curve is defined, and may include, for example, modifying an equation(s) or function(s) that define the curve, modifying two or more values (such as modifying respective x and/or y coordinates) that define the curve, etc., although one will recognize that a value may be added to a curve in other fashions).

The self-calibration procedure may be executed by the light source control circuit 340 after assembly at the installation site. For example, the light source control circuit 340 may execute the self-calibration procedure the first time that the controllable lighting device 300 is powered up (e.g., when the age of the controllable lighting device 300 is zero) to make an initial determination of the offset value $A_{2\text{-}OFF}$. The light source control circuit 340 may also execute the self-calibration procedure in response to receiving a command via the communication circuit 344, for example, from a mobile device (e.g., a smart phone or tablet), a computing device (e.g., a personal computer or laptop), or other programming tool. In addition, the light source control circuit 340 may execute the self-calibration procedure in response to an actuation of a button 350 on the controllable lighting device 300 (e.g., a button that extends through the emitter housing 110 and/or the control housing 112 and may be actuated after the lens 114 is installed). Further, the light source control circuit 340 may automatically execute the self-calibration procedure. For example, the light source control circuit 340 may automatically execute the self-calibration procedure in response to detecting that the lens 114 has been removed and re-installed, in response to detecting that the emitter PCB 130 has been installed adjacent to another emitter PCB 130, and/or in response to detecting that the controllable lighting device 300 has been serviced. In addition, the light source control circuit 340 may be configured to automatically execute the self-calibration procedure each time that the controllable lighting device 300 powers up.

Figure 10:
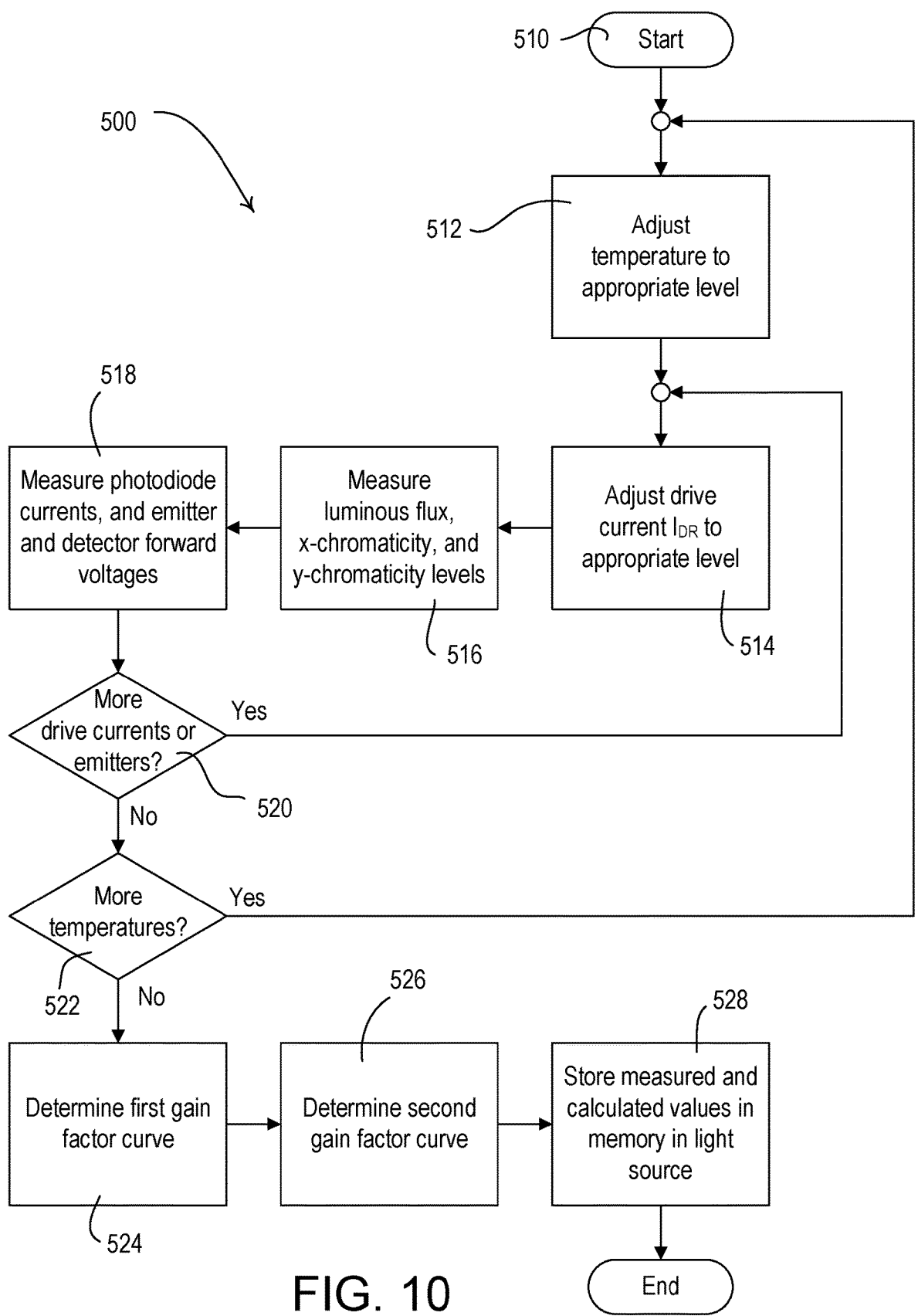
FIGS. 10 and 11 are simplified flowcharts of example calibration procedures (e.g., factory calibration procedures).

FIG. 10 is a simplified flowchart of an example calibration procedure 500 (e.g., a factory calibration procedure) that may be executed at 510 during a manufacturing process of a light source, such as the controllable lighting device 300. During the calibration procedure 500, the controllable lighting device 300 may be placed in a test system (e.g., a test environment) that may have a spectrophotometer and/or may be controlled to adjust a temperature of the test environment. The calibration procedure 500 may be executed in full and/or in part for one or more of a control circuit of the light source (e.g., the light source control circuit 340 of the controllable lighting device 300) and/or a controller of the test system. For example, the calibration procedure 500 may be executed to measure calibration values for each of the emitters 311-314 and/or the detectors 316, 318 of the controllable lighting device 300, and determine the hot gain offset value $A_{1\text{-}HOT}$ and the cold gain offset value $A_{1\text{-}COLD}$ for each of the emitter-detector pairs used to measure the luminous flux $L_E$ of the emitters 311-314.

During the calibration procedure 500, the temperature of the test system may be adjusted to a plurality of different operating temperatures, and the calibration values may be measured at each temperature. Referring to FIG. 10, the temperature of the test system may be controlled an appropriate level at 512. For example, the temperature may first be controlled to a cold calibration temperature $T_{CAL\text{-}COLD}$, such as room temperature (e.g., approximately 25° C.), and subsequently controlled to a hot calibration temperature $T_{CAL\text{-}HOT}$ (e.g., approximately 85° C.).

During the calibration procedure 500, each of the emitters (e.g., each of the emitters 311-314) may be individually turned on, and the calibration values may be measured while the single emitter is illuminated. In addition, the magnitude of a drive current conducted through each of the emitters of the light source may be adjusted to different magnitudes while the temperature of the test system is at each of the different operating temperatures, and the calibration values may be measured at each of the different magnitudes of the drive current. Referring to FIG. 10, the magnitude of the drive current of the emitter that is presently on may be adjusted to an appropriate magnitude at 514. For example, the magnitude of the drive current may be adjusted to a maximum drive current IMAX (e.g., 100%), then to 30% of the maximum drive current IMAX, and finally to 10% of the maximum drive current IMAX.

At 516, the luminous flux, x-chromaticity, and y-chromaticity of the light emitted by the light source may be measured with one of the emitters on at the drive current $I_{DR}$ set at 514 and at the temperature set at 512. For example, the luminous flux, x-chromaticity, and y-chromaticity of the light emitted by the light source may be measured by the spectrophotometer of the test system at 516. At 518, the magnitudes of the photodiode currents of the detectors, the forward voltages of the emitters, and the forward voltages of the detectors may be measured, e.g., in response to the internal feedback signals of the controllable lighting device 300.

If there are more magnitudes of the drive current $I_{DR}$ to apply to the emitter that is presently on or there are more emitters to individually illuminate at 520, the calibration procedure 500 may loop around to adjust the drive current(s) $I_{DR}$ appropriately at 514. If there are not more magnitudes of the drive current $I_{DR}$ to apply to the emitter that is presently on or there are not more emitters to individually illuminate at 520, but there are more temperatures to apply to the light source at 522, the calibration procedure 500 may loop around to adjust the temperature to the next level at 512.

If there are not more temperatures to apply to the light source at 522, a first gain factor curve (e.g., as shown in FIG. 6) may be determined and/or stored in memory at 524. For example, the first gain factor curve may be characterized by a hot gain offset value $A_{1\text{-}HOT}$ and a cold gain offset value $A_{1\text{-}COLD}$. The hot gain offset value $A_{1\text{-}HOT}$ may be calculated from the magnitude of a photodiode current $I_{PD}$-HOT of the respective detector and a luminous flux $L_{E\text{-}HOT}$ as measured at the hot calibration temperature $T_{CAL\text{-}HOT}$, e.g., $A_{1\text{-}HOT}=L_E$-HOT/$I_{PD\text{-}HOT}$. The cold gain offset value $A_{1\text{-}COLD}$ may be calculated from the magnitude of a photodiode current $I_{PD\text{-}COLD}$ of the respective detector and a luminous flux $L_{E\text{-}COLD}$ as measured at the cold calibration temperature $T_{CAL\text{-}COLD}$, e.g., $A_{1\text{-}COLD}=L_{E\text{-}COLD}/I_{PD\text{-}COLD}$. The hot gain offset value $A_{1\text{-}HOT}$ may be associated with a hot detector forward voltage $V_{FD}$-HOT, which may be measured at the hot calibration temperature $T_{CAL\text{-}HOT}$, and cold gain offset value $A_{1\text{-}COLD}$ may be associated with a cold detector forward voltage $V_{FD\text{-}COLD}$, which may be measured at the cold calibration temperature $T_{CAL\text{-}COLD}$.

At 526, a second gain factor curve (e.g., as shown in FIG. 8) may be determined and/or stored in memory (e.g., as will be described in greater detail below with reference to FIG. 11). At 528, the calibration values measured at 516, 518 and/or calculated at 524, 526 may be stored in memory, and the calibration procedure 500 may exit.

Figure 11:
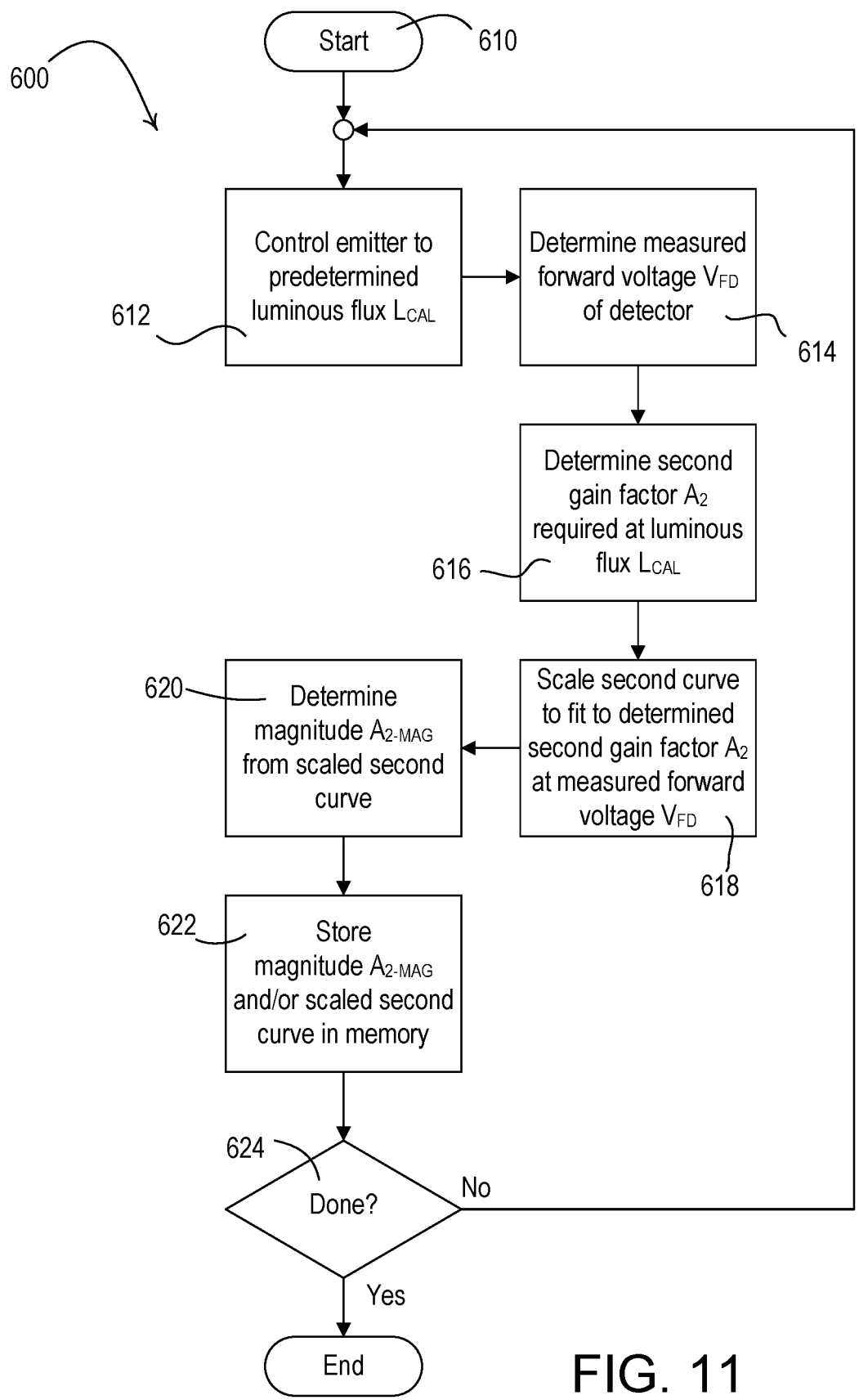

FIG. 11 is a simplified flowchart of an example calibration procedure 600 (e.g., a factory calibration procedure) that may be executed by a control circuit of a light source (e.g., the light source control circuit 340 of the controllable lighting device 300). For example, the calibration procedure 600 may be executed at 610 by the light source control circuit 340 during a manufacturing process of the light source (e.g., at 526 of the calibration procedure 500 shown in FIG. 10). For example, the light source control circuit 340 may execute the calibration procedure 600 to determine the magnitude $A_{2\text{-}MAG}$ of the second curve 450 for each of the emitter-detector pairs used to measure the luminous flux $L_E$ of one of the emitters 311-314.

At 612, the control circuit may adjust the drive currents $I_{DR}$ to control the luminous flux of the light emitted by one of the emitters (e.g., one of emitters 311-314) to a predetermined luminous flux $L_{CAL}$ (e.g., a calibration luminous flux), which may cause the emitter module 310 to heat up to an intermediate calibration temperature $T_{CAL}$. At 614, the control circuit may determine a measured forward voltage $V_{FD\text{-}CAL}$ (e.g., a calibration forward voltage) of the respective detector, which may indicate the intermediate calibration temperature $T_{CAL}$.

At 616, the control circuit may determine a gain factor $A_{2\text{-}CAL}$ required at the predetermined luminous flux $L_{CAL}$. For example, at 616, the control circuit may be configured to determine the photodiode current $I_{PD}$ of the respective detector, determine a gain value $A_{CAL}$ required to cause the output of the respective gain compensation circuit to indicate the predetermined luminous flux $L_{CAL}$, and calculate the second gain factor $A_{2\text{-}CAL}$ from the determined gain $A_{CAL}$, e.g., $A_{2\text{-}CAL}=A_{CAL}\times A_{1\text{-}CAL}$, where the first gain factor $A_{1\text{-}CAL}$ may be determined from the first curve 400 (e.g., as shown in FIG. 6).

At 618, the control circuit may generate a fitted gain factor curve by scaling a nominal curve gain factor curve to fit to the second gain factor $A_{2\text{-}CAL}$ (e.g., as determined at 616) at the measured detector forward voltage $V_{FD\text{-}CAL}$ (e.g., as shown in FIG. 8). At 620, the control circuit may determine a magnitude $A_{2\text{-}MAG}$ from the fitted gain factor curve. At 622, the control circuit may store the magnitude $A_{2\text{-}MAG}$ of the fitted gain factor curve in memory. In addition, the control circuit may store the fitted gain factor curve in memory (e.g., as values in a lookup table in memory) at 622. If the control circuit is not done calibrating the light source at 624 (e.g., there are more emitter-detector pairs to calibrate), the calibration procedure 600 may loop around to turn on the next emitter at 612. If the control circuit is done calibrating the light source at 624 (e.g., there are not more emitter-detector pairs to calibrate), the calibration procedure 600 may exit.

Figure 12:
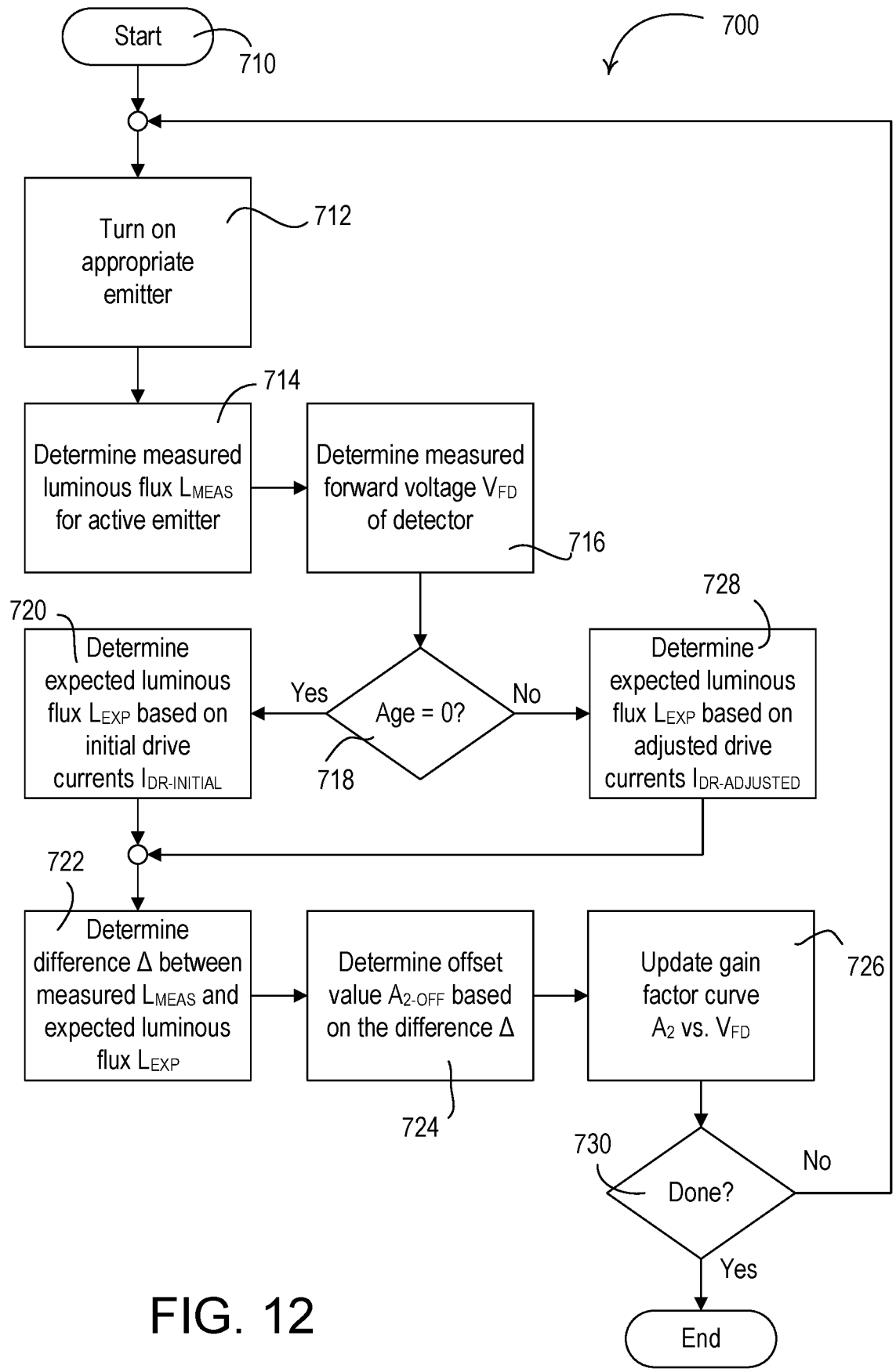
FIG. 12 is a simplified flowchart of another example calibration procedure (e.g., a self calibration procedure).

FIG. 12 is a simplified flowchart of an example calibration procedure 700 (e.g., a self calibration procedure or a field calibration procedure) that may be executed by a control circuit of a light source (e.g., the light source control circuit 340 of the controllable lighting device 300). For example, the light source control circuit 340 may execute the calibration procedure 700 to determine the offset value $A_{2-OFF}$ of the second gain factor $A_2$ (e.g., of the second curve 450) for each of the emitter-detector pairs used to measure the luminous flux $L_E$ of the emitters 311-314 of the controllable light source 300. The light source control circuit 340 may be configured to execute the calibration procedure 700 after execution of an initial factory calibration procedure (e.g., the calibration procedure 500 and/or the calibration procedure 600) For example, the light source control circuit 340 may be configured to execute the calibration procedure 700 after assembly of the light source (e.g., in the field at the installation site) to compensate for changes to the optical system that may have occurred during assembly of the light source. The light source control circuit 340 may execute the calibration procedure 700 in response to receiving a calibration command at 710, for example, in a message received via the communication circuit 344.

At 712, the control circuit may turn on one or more of the emitters to be calibrated. For example, the light source control circuit 340 may control the emitter module control circuit 336 to turn on only the first emitter 311 (e.g., the red LED) of each of the emitter modules 310 at 712. In addition, the light source control circuit 340 may control the emitter module control circuit 336 to adjust the magnitude of the respective drive current (e.g., the first drive current $I_{DR1}$) to an appropriate level (e.g., a calibration level) at 712.

At 714, the control circuit may determine a measured luminous flux $L_{MEAS}$ for the emitter that was turned on at 712. For example, the emitter module control circuit 336 may determine the measured luminous flux $L_{MEAS}$ of the first emitter 311 from the first detector 316 (e.g., in response to the first optical feedback signal $V_{FB1}$), and may transmit the measured luminous flux $L_{MEAS}$ to the light source control circuit 340 via the communication bus 342. At 716, the control circuit may determine the measured forward voltage $V_{FD}$ for the detector that was used to measure the luminous flux $L_E$ at 714. For example, the emitter module control circuit 336 may determine the magnitude of the first forward voltage $V_{FD1}$ of the first detector 316 (e.g., in response to the first detector forward-voltage feedback signal $V_{FB1}$), and may transmit the magnitude of the first forward voltage $V_{FD1}$ to the light source control circuit 340 via the communication bus 342.

If the age of the controllable lighting device 300 is zero at 718 (e.g., the lighting device was just assembled, installed, and powered on for the first time), the control circuit may determine an expected luminous flux $L_{EXP}$ for the emitter that is on at 720 and calculate a difference $\Delta$ between the expected luminous flux $L_{EXP}$ and the measured luminous flux $L_{MEAS}$ at 722. For example, the light source control circuit 340 may determine the expected luminous flux $L_{EXP}$ for the first emitter 311 at 720 based on the magnitude (e.g., the initial magnitude $I_{DR-INITIAL}$) of the first drive current $I_{DR1}$ and/or one or more of the measured operating characteristics, such as the magnitudes of the emitter forward voltages $V_{FE}$ and/or the detector forward voltages $V_{FD}$. For example, the light source control circuit 340 may determine the offset value $A_{2-OFF}$ at 722 by subtracting the measured luminous flux $L_{MEAS}$ from the expected luminous flux $L_{EXP}$.

At 724, the control circuit may determine an offset value $A_{2-OFF}$ for the second gain factor $A_2$ based on the difference $\Delta$ between the expected luminous flux $L_{EXP}$ and the measured luminous flux $L_{MEAS}$ calculated at 722. For example, the control circuit may add the difference $\Delta$ between the expected luminous flux $L_{EXP}$ and the measured luminous flux $L_{MEAS}$ to the offset value $A_{2-OFF}$ at 724 (e.g., $A_{2-OFF}=A_{2-OFF}+\Delta$). When the age of the light source is zero, an initial value of the offset value $A_{2-OFF}$ may be zero and the control circuit may simply set the offset value $A_{2-OFF}$ equal to the difference $\Delta$ between the expected luminous flux $L_{EXP}$ and the measured luminous flux $L_{MEAS}$ at 724.

At 726, the control circuit may update a gain factor curve in memory. For example, the gain factor curve may define the second gain factor $A_2$ for the first emitter 311 with respect to the first forward voltage $V_{FD1}$ of the first detector 316. The light source control circuit 340 may update the gain factor curve by adding the determined offset value $A_{2-OFF}$ at 726. For example, the light source control circuit 340 may add the determined offset value $A_{2-OFF}$ to values of the second gain factor $A_2$ in a lookup table stored in the memory 346. In addition, the light source control circuit 340 may store the determined offset value $A_{2-OFF}$ in the memory 346 and use the stored offset value $A_{2-OFF}$ during normal operation of the controllable lighting device 300 when the gain A of the first gain compensation circuit 338 is being updated.

If the age of the controllable lighting device 300 is not zero at 718 (e.g., the lighting device has been running for some time), the control circuit may determine the offset value $A_{2-OFF}$ for the second gain factor $A_2$ using the determined age at 728. For example, the light source control circuit 340 may determine the expected luminous flux $L_{EXP}$ for the first emitter 311 at 728 based on the adjusted magnitude $I_{DR-ADJUSTED}$ of the first drive current $I_{DR1}$ (e.g., to account for the age of the first emitter 311) and/or one or more of the measured operating characteristics, such as the magnitudes of the emitter forward voltages $V_{FE}$ and/or the detector forward voltages $V_{FD}$. The control circuit may then determine the difference $\Delta$ by subtracting the measured luminous flux $L_{MEAS}$ from the expected luminous flux $L_{EXP}$ at 722, determine the offset value $A_{2-OFF}$ based on the difference $\Delta$ at 724, and update the gain factor curve in memory at 726. If the control circuit is not done calibrating the light source at 730 (e.g., there are more emitter-detector pairs to calibrate), the calibration procedure 700 may loop around to turn on the next emitter at 712. For example, the light source control circuit 340 may turn off the first emitter 311 and turn on the second emitter 312 at 712. If the control circuit is done calibrating the light source at 730 (e.g., there are not more emitter-detector pairs to calibrate), the calibration procedure 700 may exit.

While the calibration procedures described herein account for changes to the optical system of one or more emitter modules by adding the offset value $A_{2-OFF}$ to the second gain factor $A_2$, an offset value $A_{1-OFF}$ could also be added to the first gain factor $A_1$ (e.g., where in the first offset value $A_{1-OFF}$ may be equal to the second offset value $A_{2-OFF}$). In addition, the controllable lighting device 300 could be calibrated at additional calibration temperatures between the hot calibration temperature $T_{CAL-HOT}$ and the cold calibration temperature $T_{CAL-COLD}$, and the second gain factor $A_2$ may not be used to determine the gain A. The memory may store a gain curve (e.g., a single gain curve) defining the gain A with respect to the forward voltage $V_{FD}$ of the respective detector and an offset value $A_{OFF}$ may be added to the gain curve to account for changes to the optical system.

What is claimed is:

1. A lighting device comprising:
    an emitter configured to emit light;
    a detector configured to detect a portion of the light emitted by the emitter and to generate a detector signal in response thereto;
    a memory configured to store data representative of an optical compensation curve as a function of a measured forward voltage of the detector, the optical compensation curve based on the sum of:
        a first gain factor (A1) characteristic of the detector, the first gain factor determined using a measured luminous flux of the emitter and a detector current; and
        a second gain factor (A2) characteristic of the detector, the second gain factor determined using the measured luminous flux of the emitter and the measured forward voltage of the detector; and
    a control circuit configured to determine an expected luminous flux of the light emitted by the emitter by multiplying the measured forward voltage of the detector by a value of the optical compensation curve at the measured forward voltage.

2. The lighting device of claim 1, wherein the emitter and the detector are mounted to a substrate and encapsulated by a dome, the emitter is configured to emit light through the dome, and the detector is configured to generate the detector current and forward voltage signals in response to light that is emitted by the emitter and internally reflected off the dome to the detector.

3. The lighting device of claim 2, wherein the optical compensation curve is indicative of a relationship between the light emitted through the dome and a magnitude of the measured forward voltage of the detector.

4. The lighting device of claim 3, further comprising:
    a receiver circuit coupled to the detector and configured to generate an optical feedback signal in response to the detector signal; and
    a gain compensation circuit coupled to the receiver circuit configured to multiply the measured forward voltage of the detector by the value of the optical compensation curve at the measured forward voltage.

5. The lighting device of claim 3, wherein the emitter, the detector, the substrate, and the dome form an optical system, and the optical compensation value is dependent upon a characteristic of the optical system.

6. The lighting device of claim 2, further comprising:
    a plurality of emitters and a plurality of detectors mounted to the substrate and encapsulated by the dome;
    wherein the control circuitry is configured to determine a respective optical compensation curve using a respective first gain factor and a respective second gain factor for each of the plurality of detectors;
    wherein the measured value of the light emitted by each of the plurality of emitters determines the respective optical compensation curve of the respective detector; and
    wherein the memory is configured to store each of the optical compensation curves for each respective one of the plurality of detectors.

7. The lighting device of claim 1, wherein the first gain factor (A1) is determined during manufacture of the lighting device.

8. The lighting device of claim 1, wherein the second gain factor (A2) is determined during manufacture of the lighting device.

9. The lighting device of claim 1, wherein the control circuit is configured to execute a calibration procedure to, subsequent to the determination of the optical compensation curve, determine an updated optical compensation curve characteristic of the detector using an updated second gain factor (A2) determined using the measured luminous flux of the emitter and a measured forward voltage across the detector.

10. The lighting device of claim 9, further comprising:
    a communication circuit configured to receive a calibration command;
    wherein the control circuit is configured to execute the calibration procedure in response to receiving the calibration command via the communication circuit.

11. The lighting device of claim 9, wherein the control circuit is configured to execute the calibration procedure in response to an actuation of a button of the lighting device.

12. The lighting device of claim 9, wherein the control circuit is configured to automatically execute the calibration procedure.

13. The lighting device of claim 1, wherein the control circuit is configured to adjust a magnitude of a drive current conducted through the emitter to an adjusted magnitude to maintain a luminous flux of the light emitted by the emitter at a target luminous flux as the lighting device ages, and to determine an expected value of the luminous flux based on the adjusted magnitude of the drive current.

14. The lighting device of claim 1, wherein the data representative of the optical compensation curve is stored in a lookup table in the memory.

15. A method of calibrating a lighting device, the method comprising:
    emitting light from an emitter of the lighting device;
    measuring luminous flux of at least a portion of the light emitted by the emitter;
    detecting, by a detector disposed in the lighting device, luminous flux of at least a portion of the light emitted by the emitter and internally reflected within the lighting device;
    determining an optical compensation curve characteristic of the detector, the optical compensation curve based on the sum of:
        a first gain factor (A1) characteristic of the detector, the first gain factor determined using the measured luminous flux and a detector current; and
        a second gain factor (A2) characteristic of the detector, the second gain factor determined using the measured luminous flux and a detector forward voltage; and
    determining an expected luminous flux of at least the portion of the light emitted by the emitter using the detected portion of the light emitted by the emitter by multiplying a value of the detector forward voltage by a value of the optical compensation curve at the detector forward voltage.

16. The method of claim 15, further comprising:
    receiving, subsequent to the determination of the optical compensation curve, a calibration command to determine an updated optical compensation curve via a communication circuit of the lighting device and initiating in response thereto:
    measuring a subsequent luminous flux of at least the portion of the light emitted by the emitter;

detecting at least a subsequent portion of the light emitted by the emitter and internally reflected within the lighting device;

determining the updated optical compensation curve characteristic of the detector, the updated optical compensation curve based on the sum of:

the first gain factor (A1); and an updated second gain factor (A2) characteristic of the detector, the second gain factor determined using the subsequent measured luminous flux and the detector forward voltage; and determining the expected luminous flux of at least the portion of the light using the detected subsequent portion of the light by multiplying the value of the detector forward voltage by the value of the updated optical compensation curve at the detector forward voltage.

17. The method of claim 15, further comprising:
determining the optical compensation curve upon application of power to the lighting device.

18. The method of claim 16, further comprising:
determining the updated optical compensation curve responsive to actuation of an input device.

19. The method of claim 15, further comprising:
determining the updated optical compensation curve responsive to an occurrence of a predetermined event.

20. The method of claim 15, further comprising:
adjusting a magnitude of a drive current applied to the emitter to maintain a luminous flux of at least the portion of the light emitted by the emitter at a target luminous flux as the lighting device ages.

21. A lighting device comprising:

an emitter configured to emit light, a first portion of the emitted light external to the lighting device and a second portion of the emitted light internally reflected within the lighting device;

a detector configured to generate a detector signal in response to detecting at least the second portion of the light emitted by the emitter;

a memory configured to store an optical compensation curve as a function of a measured forward voltage of the detector, the optical compensation curve characteristic of the detector and based on the sum of:

a first gain factor (A1) characteristic of the detector, the first gain factor determined using a measured luminous flux of the emitter and a detector current; and a second gain factor (A2) characteristic of the detector, the second gain factor determined using the measured luminous flux of the emitter and the measured forward voltage of the detector; and a control circuit configured to:

receive the measured forward voltage of the detector; and determine an expected luminous flux of the first portion of the light emitted by the emitter by multiplying the measured forward voltage of the detector by a value of the optical compensation curve corresponding to the measured forward voltage of the detector.

22. The lighting device of claim 21, wherein the control circuit is configured to:

measure the luminous flux of the first portion of the light emitted by the emitter;

receive a detector signal in response to detection of the second portion of the light emitted by the emitter;

determine an updated optical compensation curve characteristic of the detector, the updated optical compensation curve based on the sum of:

the first gain factor (A1); and an updated second gain factor (A2) characteristic of the detector, the second gain factor determined using the measured luminous flux of the first portion of light emitted by the emitter and the measured forward voltage of the detector; and determine the expected luminous flux of the first portion of the light using the second portion of the light by multiplying the measured forward voltage of the detector by a value of the updated optical compensation curve at the measured forward voltage of the detector.

23. The lighting device of claim 9, wherein the control circuit is configured to execute the calibration procedure upon application of power to the lighting device.

* * * * *